US010088718B2

(12) United States Patent
Li et al.

(10) Patent No.: US 10,088,718 B2
(45) Date of Patent: Oct. 2, 2018

(54) TOUCH LIQUID CRYSTAL DISPLAY AND METHOD OF CONTROLLING THE SAME

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Xianxiang Zhang, Shanghai (CN); Yingying Xu, Shanghai (CN); Xiaoye Li, Shanghai (CN); Gang Liu, Shanghai (CN); Xingyao Zhou, Shanghai (CN); Kang Yang, Shanghai (CN); Zhaokeng Cao, Shanghai (CN); Juan Zhu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/696,661

(22) Filed: Sep. 6, 2017

(65) Prior Publication Data
US 2017/0363919 A1  Dec. 21, 2017

Related U.S. Application Data

(63) Continuation-in-part of application No. 14/700,097, filed on Apr. 29, 2015, now Pat. No. 9,785,018.

(30) Foreign Application Priority Data

Dec. 22, 2014  (CN) .......................... 2014 1 0826469

(51) Int. Cl.
G02F 1/1343 (2006.01)
G02F 1/1333 (2006.01)
(Continued)

(52) U.S. Cl.
CPC ...... *G02F 1/134336* (2013.01); *G02F 1/1362* (2013.01); *G02F 1/1368* (2013.01);
(Continued)

(58) Field of Classification Search
CPC ...... G06F 3/041; G06F 3/0412; G06F 3/0416; G02F 1/13338; G02F 1/133514;
(Continued)

(56) References Cited

U.S. PATENT DOCUMENTS

2011/0291963 A1  12/2011  Woo et al.
2012/0057312 A1* 3/2012 Yoo .................... G06F 3/044
  361/749

(Continued)

FOREIGN PATENT DOCUMENTS

CN  101681221 A  3/2010
CN  103809792 A  5/2014
CN  103902110 A  7/2014

*Primary Examiner* — Nathan Danielsen
(74) *Attorney, Agent, or Firm* — Anova Law Group, PLLC

(57) ABSTRACT

A touch control display and a controlling method are provided. The display comprises a TFT array substrate; an opposite substrate; a cover glass disposed on an outside surface of the opposite substrate, wherein the cover glass has an inner surface facing the opposing substrate and an outside surface, and the cover glass, the TFT array substrate, and the opposite substrate collectively define a display area and a non-display area; first electrodes disposed in the display area of the opposite substrate; second electrodes disposed in the non-display area of the cover glass, and on the inner surface of the cover glass; and third electrodes disposed between the opposite substrate and the TFT array substrate. The third electrodes are disposed opposite to the plurality of first electrodes, and at least one of the plurality of third electrodes is multiplexed as a common electrode of the TFT array substrate.

19 Claims, 20 Drawing Sheets

(51) Int. Cl.
  *G06F 3/041* (2006.01)
  *G06F 3/044* (2006.01)
  *G02F 1/1345* (2006.01)
  *G02F 1/1362* (2006.01)
  *G02F 1/1335* (2006.01)
  *G02F 1/1368* (2006.01)

(52) U.S. Cl.
  CPC ...... *G02F 1/13338* (2013.01); *G02F 1/13439* (2013.01); *G02F 1/13452* (2013.01); *G02F 1/13458* (2013.01); *G02F 1/133514* (2013.01); *G06F 3/044* (2013.01); *G06F 3/0412* (2013.01); *G06F 3/0416* (2013.01); *G02F 2001/133388* (2013.01); *G02F 2201/121* (2013.01)

(58) Field of Classification Search
  CPC ........... G02F 1/13439; G02F 1/134356; G02F 1/1368; G02F 2001/133388; G09G 3/36–3/3696
  See application file for complete search history.

(56) References Cited

U.S. PATENT DOCUMENTS

| | | |
|---|---|---|
| 2012/0235948 A1 | 9/2012 | Inoue et al. |
| 2013/0293498 A1* | 11/2013 | Kim ...................... G06F 3/0412 345/173 |
| 2013/0301195 A1* | 11/2013 | Yeh ...................... G06F 3/0412 361/679.01 |
| 2014/0111466 A1 | 4/2014 | Kim et al. |
| 2014/0191770 A1 | 7/2014 | Lefebvre |
| 2014/0253501 A1 | 9/2014 | Noguchi et al. |
| 2015/0042908 A1* | 2/2015 | Wang ...................... G06F 3/044 349/12 |
| 2015/0309634 A1 | 10/2015 | Lee et al. |

* cited by examiner

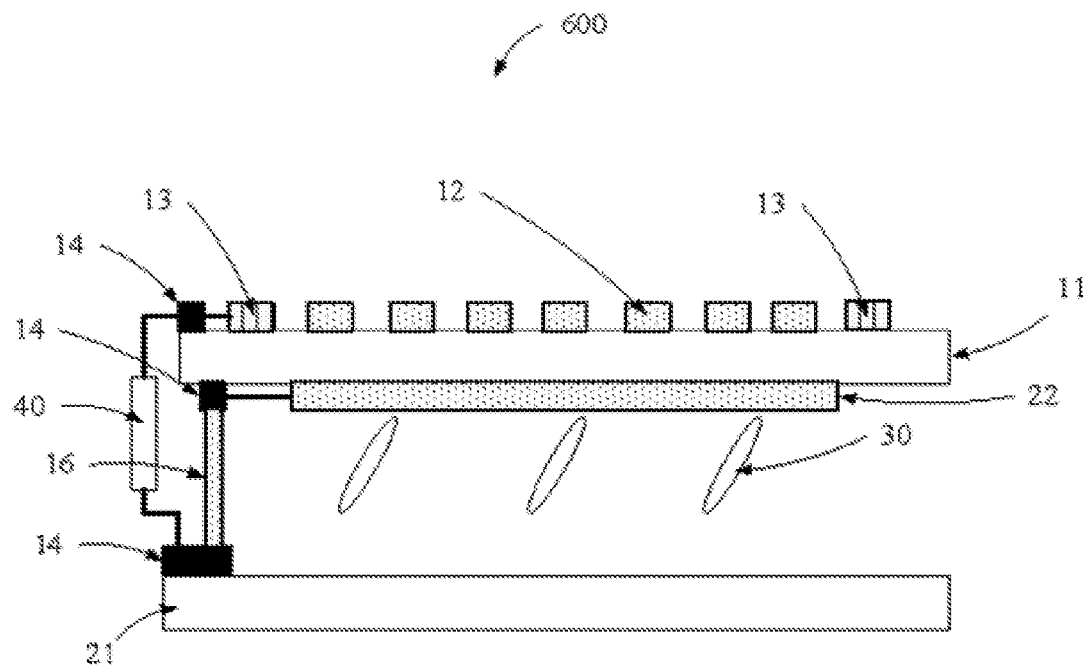

FIG. 7

Applying a first scanning signal to the plurality of third electrodes 22, and detecting a change of coupling capacitance between the plurality of first electrodes 12 and the plurality of third electrodes 22 by the plurality of first electrodes 12 to obtain a coordinate of a touch on the display area — S10

Applying a second scanning signal to the plurality of non-display area electrodes, and detecting a change of coupling capacitance between the plurality of first electrodes 12 and the plurality of non-display area electrodes by the plurality of first electrodes 12 to obtain a coordinate of a touch on the non-display area — S11

FIG. 8

TOUCH LIQUID CRYSTAL DISPLAY AND METHOD OF CONTROLLING THE SAME

CROSS-REFERENCES TO RELATED APPLICATIONS

This application is a continuation-in-part (CIP) application of U.S. patent application Ser. No. 14/700,097, filed on Apr. 29, 2015 which claims priority to Chinese patent application No. 201410826469.0, filed with the State Intellectual Property Office of People's Republic of China on Dec. 22, 2014, the content of all of which is incorporated herein by reference in its entirety.

TECHNICAL FIELD

The present disclosure relates to the field of display technologies and particularly to a touch liquid crystal display and a method of controlling the same.

BACKGROUND OF THE INVENTION

In the existing touch liquid crystal display, the touch electrodes of the touch panel are generally located inside of the display panel to decrease the overall thickness and production cost thereof. Particularly, the common electrodes of the liquid crystal display are concurrently used as the touch electrodes of the touch panel. Since the common electrodes are located only in the display area of liquid crystal display but no common electrodes are located in a non-display area, a touch area of liquid crystal display is limited to the display area, and the touch function becomes inoperative in the non-display area of the touch panel, i.e., an edge area, thus degrading the touch performance of the touch liquid crystal display.

BRIEF SUMMARY OF THE INVENTION

One aspect of the present disclosure provides a touch control display. The display comprises a thin-film-transition (TFT) array substrate; an opposite substrate arranged opposite to the TFT array substrate, wherein the opposite substrate has an inner surface facing the TFT array substrate and an outside surface; a cover glass disposed on the outside surface of the opposite substrate, wherein the cover glass has an inner surface facing the opposing substrate and an outside surface, and the cover glass, the TFT array substrate, and the opposite substrate collectively define a display area and a non-display area; a plurality of first electrodes disposed in the display area of the opposite substrate; a plurality of second electrodes disposed in the non-display area of the cover glass, and disposed on the inner surface of the cover glass; and a plurality of third electrodes disposed between the opposite substrate and the TFT array substrate, wherein the plurality of third electrodes are disposed opposite to the plurality of first electrodes, and at least one of the plurality of third electrodes is multiplexed as a common electrode of the TFT array substrate.

Another aspect of the present disclosure provides a method of controlling the disclosed touch control display. The method includes applying a first scanning signal to the plurality of third electrodes, detecting a change of coupling capacitance between the plurality of first electrodes and the plurality of third electrodes with the plurality of first electrodes to obtain a coordinate of a touch in the display area; and applying a second scanning signal to the plurality of second electrodes, and detecting a change of coupling capacitance between the plurality of first electrodes and the plurality of second electrodes by the plurality of first electrodes to obtain a coordinate of a touch in the non-display area.

Another aspect of the present disclosure provides a method of controlling the disclosed touch control display. The method includes applying a first scanning signal to the plurality of first electrodes/the plurality of third electrodes, detecting a change of coupling capacitance between the plurality of first electrodes and the plurality of third electrodes with the plurality of third electrodes/the plurality of first electrodes which are not applied the first scanning signal, to obtain a coordinate of a touch on the display area; and applying a second scanning signal to the plurality of second electrodes, and detecting self-capacitance of the plurality of second electrodes by the plurality of second electrodes, to obtain a coordinate of a touch on the non-display area.

BRIEF DESCRIPTION OF THE DRAWINGS

FIG. 7 illustrates a sectional view of a touch liquid crystal display according to an embodiment of the present disclosure.

FIG. 8 illustrates a flow chart of a method of controlling a touch liquid crystal display according to an embodiment of the present disclosure.

DETAILED DESCRIPTION OF THE PREFERRED EMBODIMENTS

Figure 1:
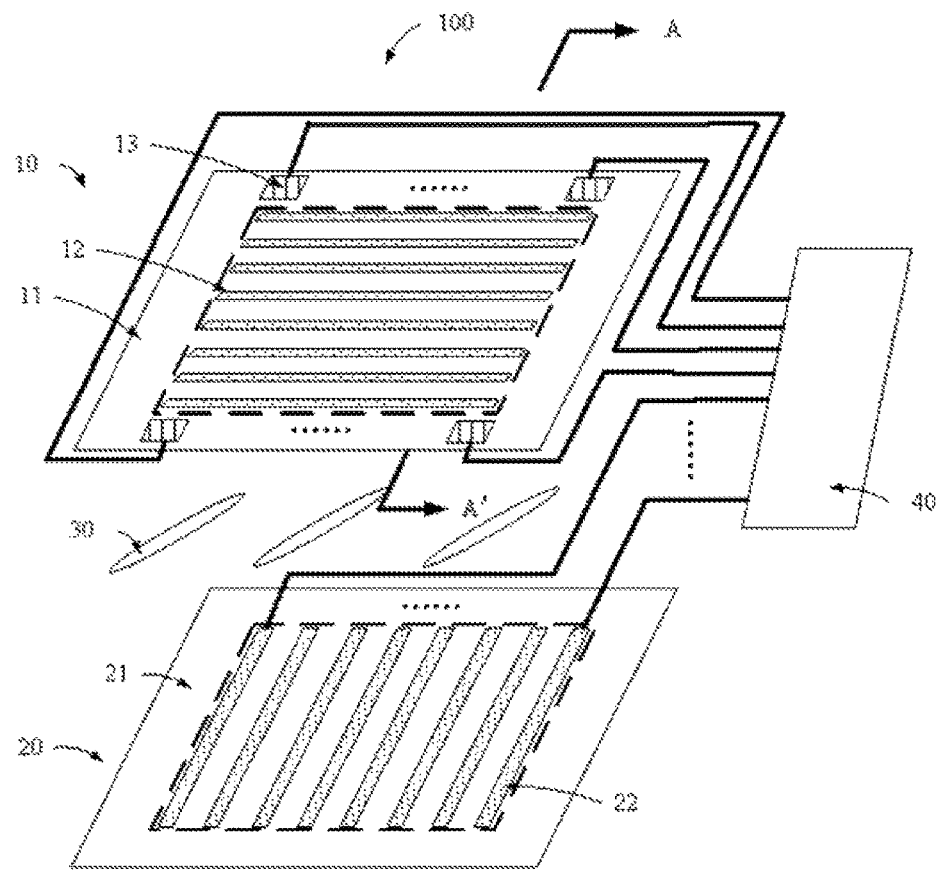
FIG. 1 illustrates a schematic structural diagram of a touch liquid crystal display according to an embodiment of the present disclosure.

Implementations of a touch liquid crystal display and a method of controlling the same according to the embodiments of the present disclosure will be described below in details with reference to the drawings.

The shapes and thicknesses of respective structures in the drawings will not reflect the real scale of an array substrate or an opposite substrate but are merely intended to illustrate the present disclosure.

Throughout the specification, while such terms as "first," "second," etc., may be used to describe various components, such components must not be limited to the above terms. The above terms are used only to distinguish one component from another. Also, a singular form may include plural forms, unless there is a particular description contrary thereto.

As illustrated in FIG. 1, a touch liquid crystal display 100 according to an embodiment of the present disclosure includes: an opposite substrate 10, a TFT array substrate 20, a liquid crystal layer 30 and a flexible printed circuit board 40. The opposite substrate 10 and the TFT array substrate 20 are located opposite to each other. The liquid crystal layer 30 is located between the opposite substrate 10 and the TFT array substrate 20. The flexible printed circuit board 40 is electrically connected with the opposite substrate 10 and the TFT array substrate 20. The opposite substrate 10 and the TFT array substrate 20 collectively define a display area and a non-display area.

Figure 2:
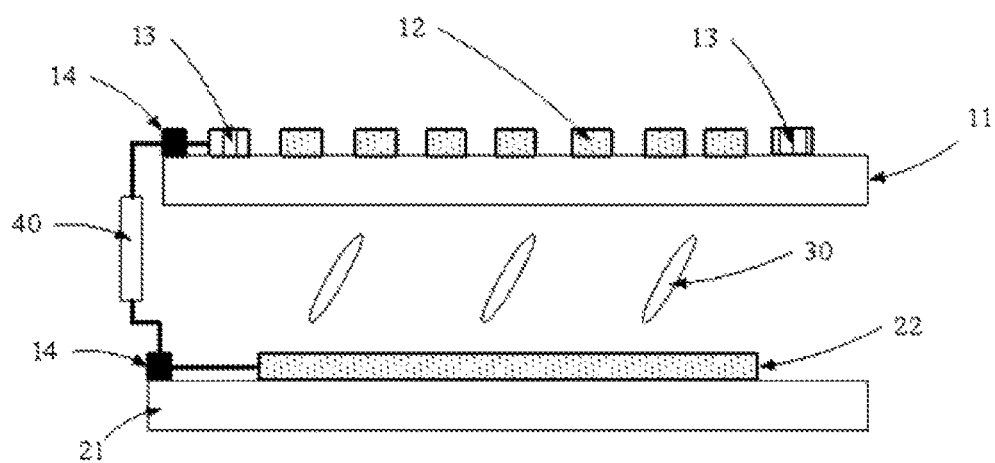
FIG. 2 illustrates a sectional view of the touch liquid crystal display in FIG. 1 taken along the AA' direction.

The opposite substrate 10 can be a color filter substrate or other substrate. The opposite substrate 10 can include a first substrate 11 defining the display area and the non-display area, a plurality of first electrodes 12 and a plurality of second electrodes 13. The plurality of first electrodes 12 and the plurality of second electrodes 13 are located on surfaces of the first substrate 11. Particularly, the plurality of first electrodes 12 are located in the display area of the first substrate 11, the plurality of second electrodes 13 are located in the non-display area of the first substrate 11. Furthermore, the plurality of first electrodes 12 and the plurality of second electrodes 13 can be located on the same surface or different surfaces of the first substrate 11. When the plurality of first electrodes 12 and the plurality of second electrodes 13 are located on the same surface of the first substrate 11, the plurality of first electrodes 12 and the plurality of second electrodes 13 can be formed by a same pattern process using a same mask. In one embodiment, the plurality of first electrodes 12 and the plurality of second electrodes 13 are located on the surface of the first substrate 11 facing away from the TFT array substrate 20. The plurality of first electrodes 12 are spaced apart from one another and substantially extend along a first direction. The plurality of second electrodes 13 are spaced apart from one another along the first direction and on two opposite sides of the first substrate 11. As illustrated in FIG. 2, which is a sectional view of FIG. 1 taken along the AA', each of the plurality of second electrodes 13 is electrically connected with the flexible printed circuit board 40 through a wire terminal 14. The plurality of first electrodes 12 can be driving electrodes or sensing electrodes. The plurality of second electrodes 13 can be driving electrodes, or sensing electrodes, or both driving electrodes and sensing electrodes. In one embodiment, the plurality of first electrodes 12 are sensing electrodes and the plurality of second electrodes 13 are driving electrodes.

The TFT array substrate 20 includes a second substrate 21 and a plurality of third electrodes 22. The plurality of third electrodes 22 are located in the display area of the second substrate 21 and opposite the plurality of first electrodes 12. The plurality of third electrodes 22 are spaced apart from one another and substantially extend along the second direction. The first direction intersects the second direction to form an angle which is above 0° and smaller than or equal to 90°. In one embodiment, the angle is about 90°. Each of the plurality of third electrodes 22 are electrically connected with the flexible printed circuit board 40 through a wire terminal 14. The plurality of third electrodes 22 can be concurrently used as the common electrodes of the TFT array substrate 20. Moreover, the plurality of third electrodes 22 can be driving electrode or sensing electrode. In the embodiment, the plurality of third electrodes 22 are driving electrodes.

As can be understood, in the display area, the plurality of first electrodes 12 intersect the plurality of third electrodes 22 and opposite the plurality of third electrodes 22, thus the touch function can be implemented by mutual capacitance. In the non-display area, the touch function can be implemented by self-capacitance of the plurality of second electrodes 13, or can be implemented by mutual capacitance between the plurality of second electrodes 13 and the plurality of first electrodes 12. Therefore, the touch function of the touch liquid crystal display 100 can be improved.

Figure 3:
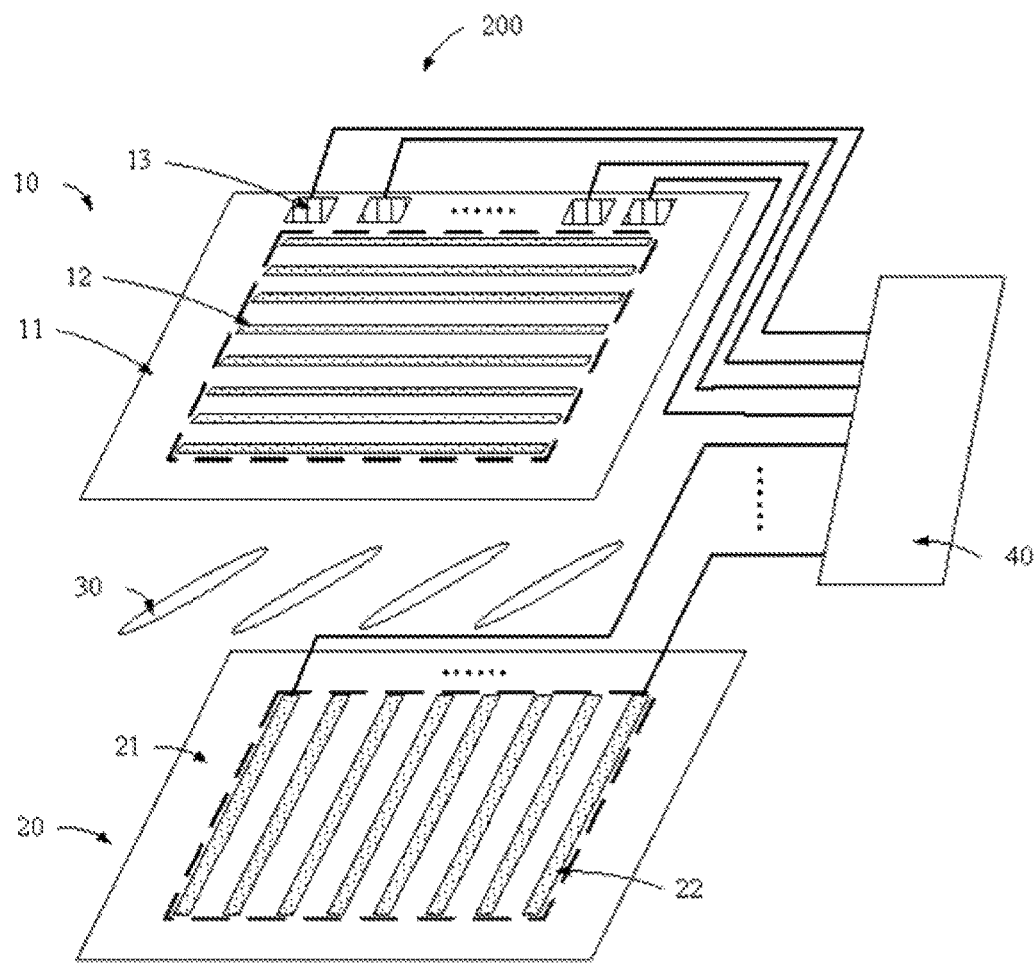
FIG. 3 illustrates a schematic structural diagram of a touch liquid crystal display according to an embodiment of the present disclosure.

Referring to FIG. 3, an embodiment of the present disclosure provides a touch liquid crystal display 200. The structure of touch liquid crystal display 200 is substantially the same as that of touch liquid crystal display 100, the difference is that the plurality of second electrodes 13 are spaced apart one another along the first direction and located on one side of the first substrate 11.

Figure 4:
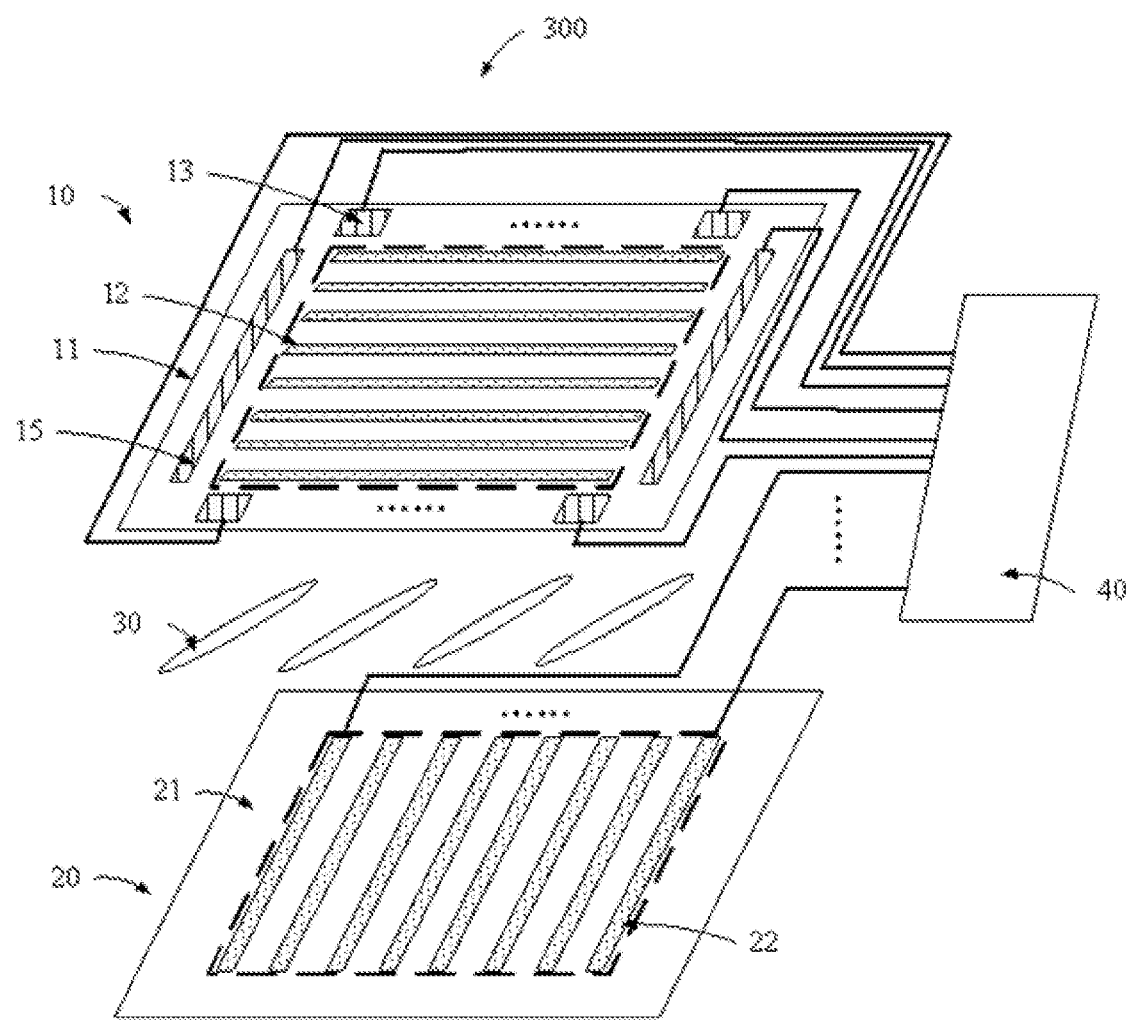
FIG. 4 illustrates a schematic structural diagram of a touch liquid crystal display according to an embodiment of the present disclosure.

Referring to FIG. 4, an embodiment of the present disclosure provides a touch liquid crystal display 300. The structure of touch liquid crystal display 300 is substantially the same as that of touch liquid crystal display 100, the difference is that the opposite substrate 10 further includes a plurality of the fourth electrodes 15 which have strip shapes. The plurality of fourth electrodes 15 are located in the non-display area of the first substrate 11. Particularly, the plurality of fourth electrodes 15 are located on two opposite sides of the first substrate 11 perpendicular to the first direction. Furthermore, the plurality of fourth electrodes 15 can be located on the same surface of the plurality of first substrate 11 as the plurality of first electrodes 12 and the plurality of second electrodes 13, or be located on the different surfaces of the plurality of first substrate 11 from the plurality of first electrodes 12 and the plurality of second electrodes 13. When the plurality of fourth electrodes 15, the plurality of first electrodes 12 and the plurality of second electrodes 13 are located on the same surface of the first substrate 11, the plurality of fourth electrodes 15, the plurality of first electrodes 12 and the plurality of second electrodes 13 can be formed by one pattern process using a same mask. In the embodiment, the plurality of fourth electrodes 15 are located on the surface of the first substrate 11 facing away from the TFT array substrate 20. Each of the plurality of fourth electrodes 15 is electrically connected to the flexible printed circuit board 40 by a wire terminal 14. The plurality of fourth electrodes 15 can be driving electrodes or the sensing electrodes. In the embodiment, the plurality of fourth electrodes 15 are both the driving electrodes and the sensing electrodes.

Figure 5:
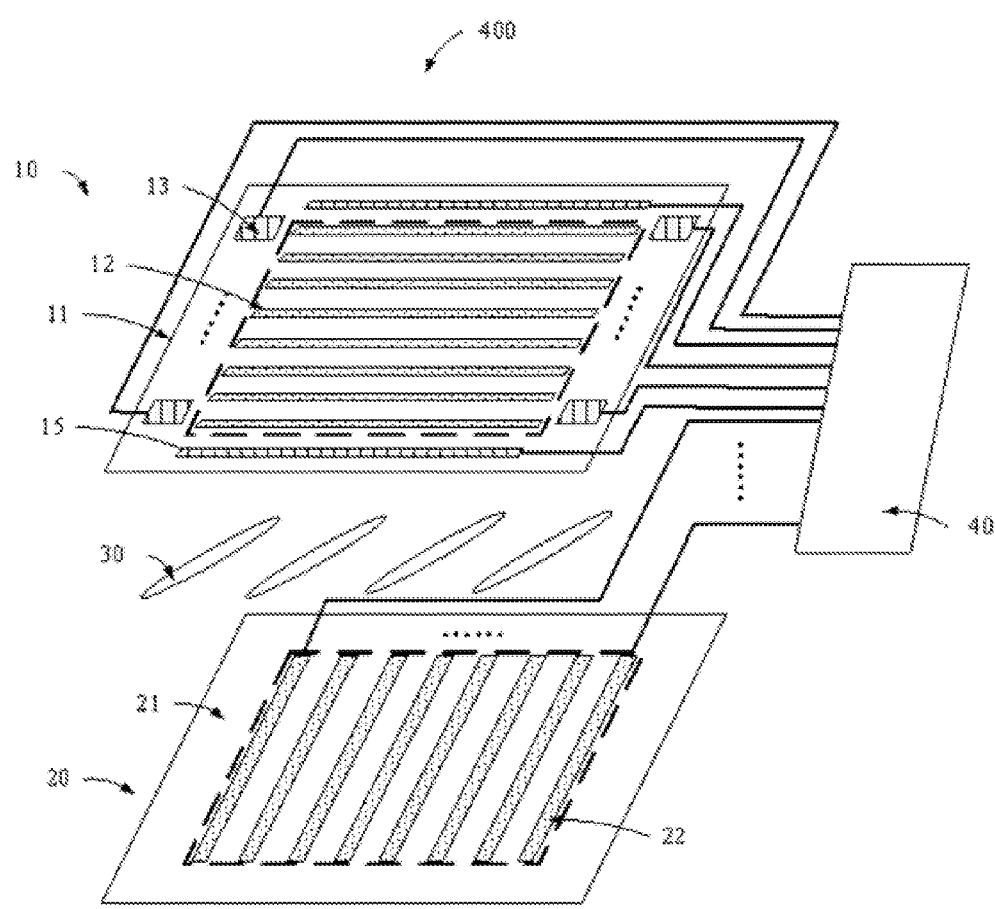
FIG. 5 illustrates a schematic structural diagram of a touch liquid crystal display according to an embodiment of the present disclosure.

Referring to FIG. 5, an embodiment of the present disclosure provides a touch liquid crystal display 400. The structure of touch liquid crystal display 400 is substantially the same as that of touch liquid crystal display 300, the difference is that the plurality of fourth electrodes 15 are located parallel on two sides of the first substrates 11 parallel to the first direction, and the plurality of second electrodes 12 are located on two sides of the first substrate 11 perpendicular to the first direction.

Figure 6:
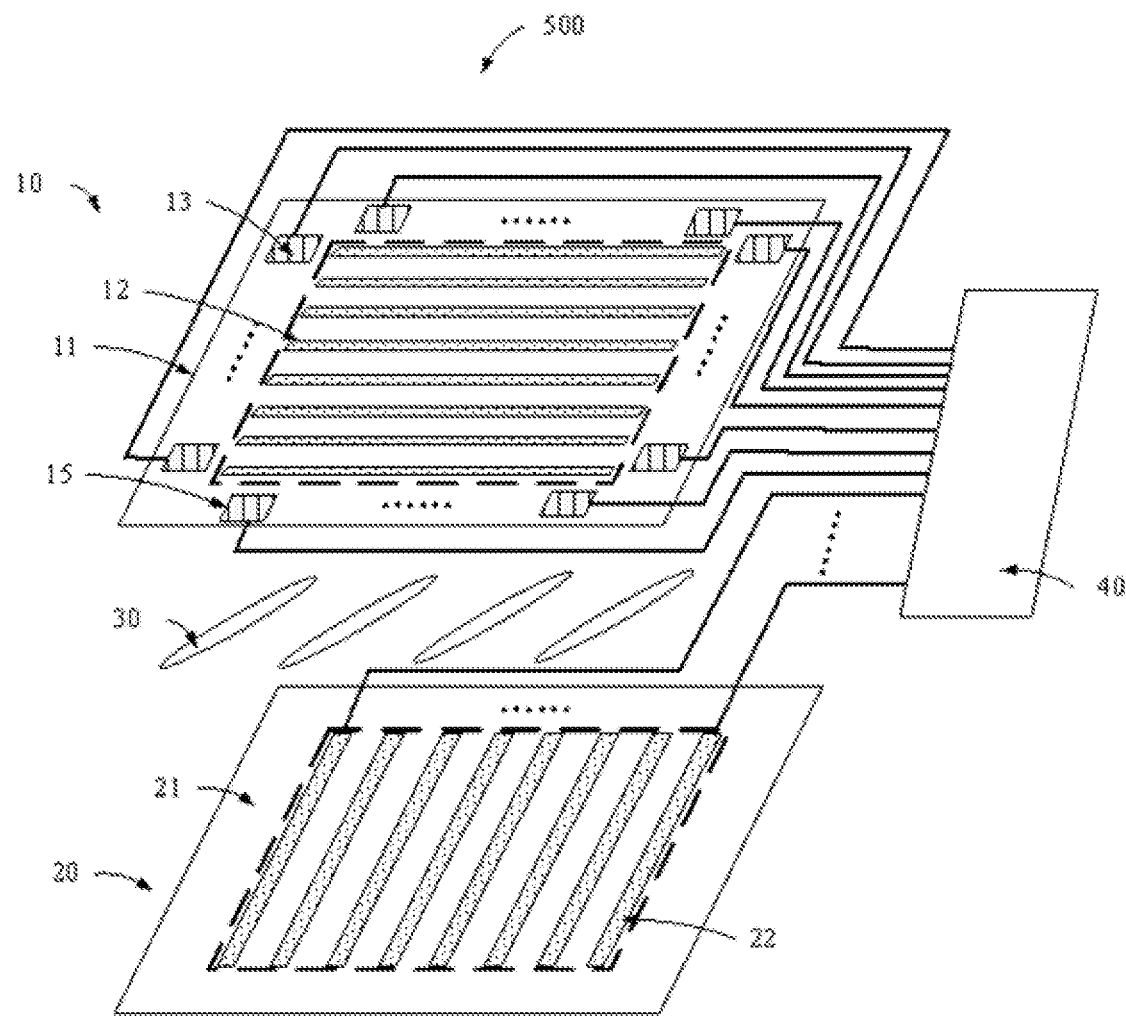
FIG. 6 illustrates a schematic structural diagram of a touch liquid crystal display according to an embodiment of the present disclosure.

Referring to FIG. 6, an embodiment of the present disclosure provides a touch liquid crystal display 500. The structure of touch liquid crystal display 500 is substantially the same as that of touch liquid crystal display 400, the difference is that the plurality of fourth electrodes 15 have sheet shapes, and are spaced apart from one another on two sides of the first substrates 11 perpendicular to the first direction.

Referring to FIG. 7, an embodiment of the present disclosure provides a touch liquid crystal display 600. The structure of touch liquid crystal display 600 is substantially the same as that of touch liquid crystal display 100, the difference is that the plurality of third electrodes 22 are located on the surface of the first substrate 11 close to the liquid crystal layer 30. Moreover, the plurality of third electrodes 22 can be electrically connected with the flexible printed circuit board 40 through the wire terminal 14 and a conductive adhesive 16 located on the first substrate 11 and the second substrate 21.

The touch liquid crystal display according to the embodiments of the present disclosure can be applied to a mobile phone, a tablet PC, a TV set, a display, a notebook PC, a digital frame, a navigator and any other product or component.

For convenient description, the plurality of second electrodes 13 and the plurality of fourth electrodes 15 in the non-display area are defined as a plurality of non-display area electrodes. Referring to FIG. 8, a method of controlling liquid crystal display according to the embodiment of the present disclosure, includes:

S10: applying a first scanning signal to the plurality of third electrodes 22, and detecting a change of coupling capacitance between the plurality of first electrodes 12 and the plurality of third electrodes 22 with the plurality of first electrodes 12 to obtain a coordinate of a touch on the display area; and S11: applying a second scanning signal to the non-display area electrodes, and detecting a change of coupling capacitance between the plurality of first electrodes 12 and the plurality of non-display area electrodes with the plurality of first electrodes 12 to obtain a coordinate of a touch on the non-display area.

The perform order of steps S10 and S11 is not limited thereto.

Figure 9:
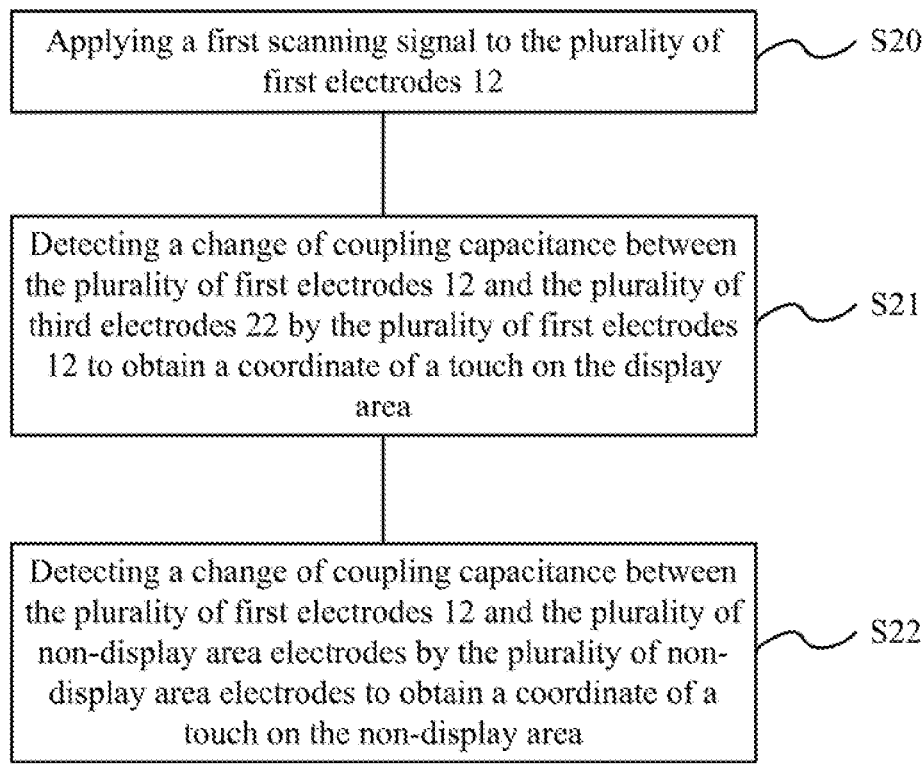
FIG. 9 illustrates a flow chart of a method of controlling a touch liquid crystal display according to an embodiment of the present disclosure.

Referring to FIG. 9, a method of controlling liquid crystal display according to another embodiment of the present disclosure, includes:

S20: applying a first scanning signal to the plurality of first electrodes 12;

S21: detecting a change of coupling capacitance between the plurality of first electrodes 12 and the plurality of third electrodes 22 with the plurality of first electrodes 12 to obtain a coordinate of a touch on the display area; and S22: detecting a change of coupling capacitance between the plurality of first electrodes 12 and the plurality of non-display area electrodes with the plurality of non-display area electrodes to obtain a coordinate of a touch on the non-display area.

The step S21 and the step S22 can be performed at the same time or can be performed separately. In one embodiment, the steps S21 and S22 are performed at the same time to save time.

Figure 10:
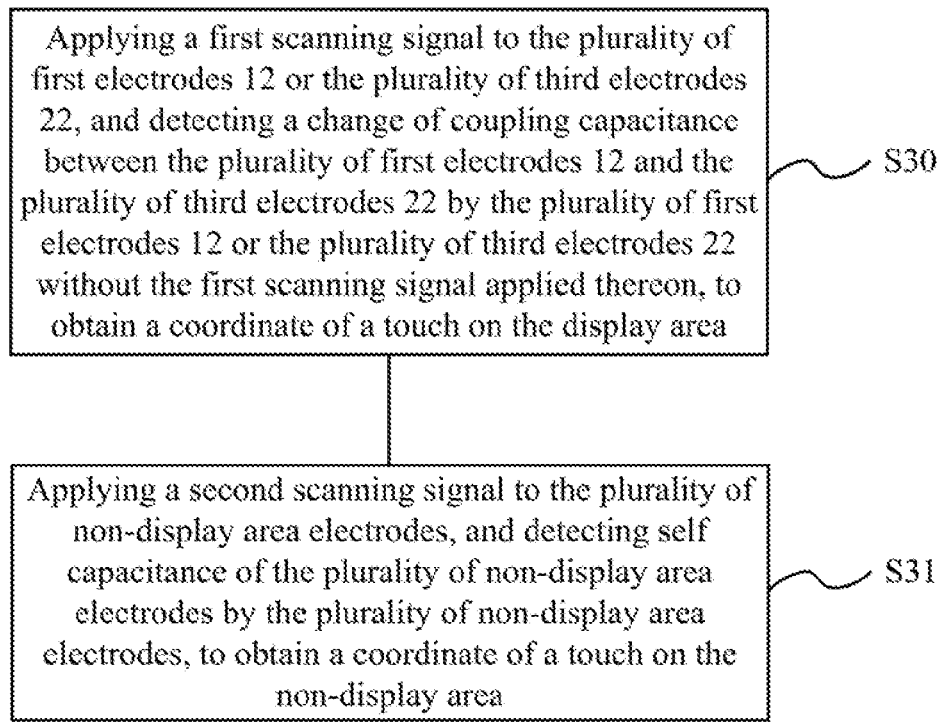
FIG. 10 illustrates a flow chart of a method of controlling a touch liquid crystal display according to an embodiment of the present disclosure.

Referring to FIG. 10, a method of controlling liquid crystal display according to another embodiment of the present disclosure, includes:

S30: applying a first scanning signal to the plurality of first electrodes 12 or to the plurality of third electrodes 22, and detecting a change of coupling capacitance between the plurality of first electrodes 12 and the plurality of third electrodes 22 with the plurality of first electrodes 12 or the plurality of third electrodes 22 without the first scanning signal applied thereto, to obtain a coordinate of a touch on the display area; and S31: applying a second scanning signal to the plurality of non-display area electrodes, and detecting self-capacitance of the plurality of non-display area electrodes with the plurality of non-display area electrodes to obtain a coordinate of a touch on the non-display area.

The steps S30 and S31 can be performed at the same time or different time. In one embodiment, the steps S30 and S31 are performed substantially at the same time to save scan time. An intensity of the first scanning signal can be the same as an intensity of the second scanning signal or can be different from the intensity of second scanning signal. Particularly, the intensity of first scanning signal can be stronger than or equal to the intensity of second scanning signal.

In the above disclosed touch liquid crystal displays and method of controlling the touch liquid crystal displays, the first electrodes 12 and the non-display area electrodes are located on the same surface of the first substrate 11, such that the non-display area electrodes and the first electrodes 12 can be formed by a same pattern process using a same mask. Accordingly, the touch function of the display is improved, while the number of the masks used in the fabrication of the touch liquid crystal displays may not be increased, and the fabrication cost may not be increased.

Further, the disclosed touch liquid crystal display also comprises a cover glass or cover lens, which is disposed on a light-exiting side of the touch liquid crystal display, i.e., a side facing the viewers. The opposite substrate has an inner surface facing the TFT array substrate and an outside surface, and the cover glass is disposed on the outside surface of the opposing substrate. The cover glass is made of transparent rigid or flexible materials, such as transparent glass, or transparent plastic.

The cover glass has an inner surface facing the opposing substrate and an outside surface. The non-display area electrodes, such as the second electrodes and the fourth electrodes, are disposed on the inner surface of the cover glass. Thus, the existing opposing substrate and the TFT array substrate do not have to be modified. Once the liquid crystal cell is formed by attaching the opposing substrate to the TFT array substrate, the cover glass having various layouts of the non-display area electrodes (i.e., the electrodes disposed in the non-display area) may be fabricated, and then attached to the outside surface of the opposing substrate by liquid optically clear adhesives (LOCA).

Exemplary touch liquid crystal displays will be illustrated in FIGS. 10-21.

Figure 11:
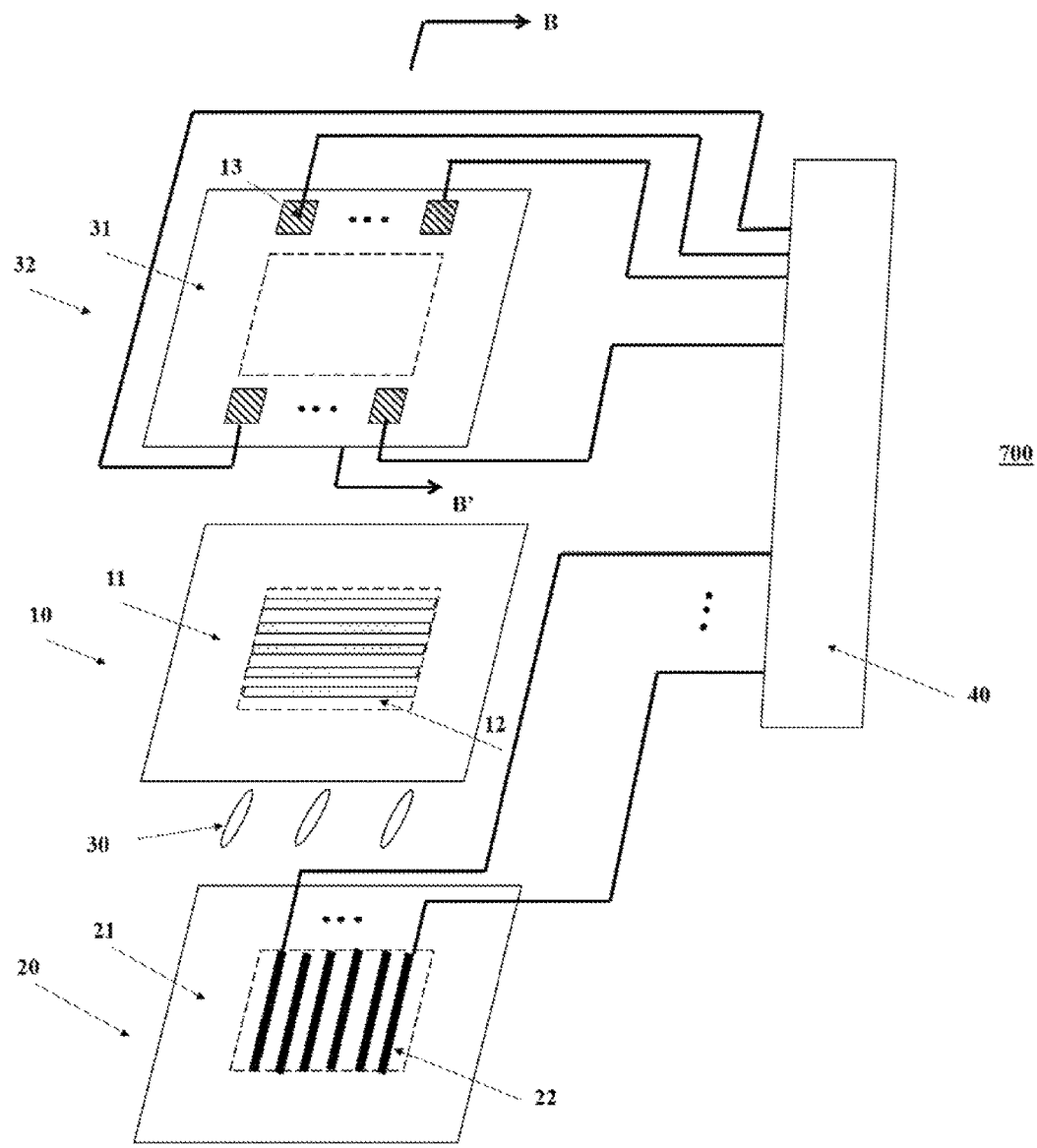
FIG. 11 illustrates a schematic structural diagram of a touch liquid crystal display according to an embodiment of the present disclosure.
Figure 12:
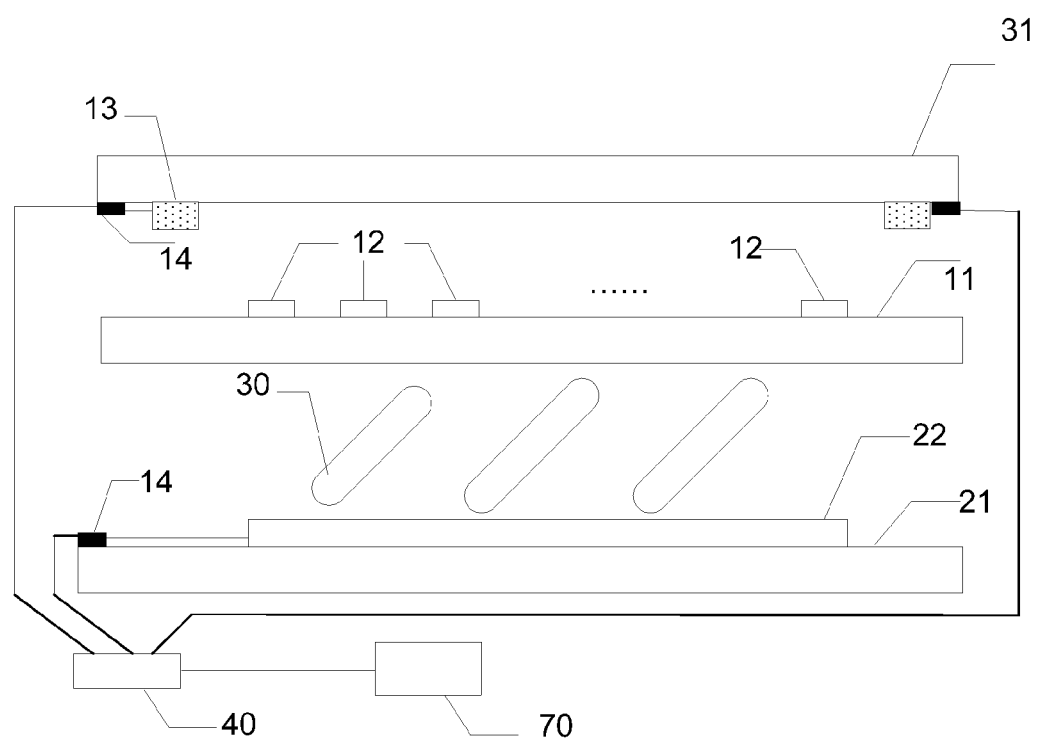
FIG. 12 illustrates a sectional view of the touch liquid crystal display in FIG. 11 taken along the BB' direction.

FIG. 11 illustrates a schematic structural diagram of a touch liquid crystal display according to an embodiment of the present disclosure. FIG. 12 illustrates a sectional view of the touch liquid crystal display in FIG. 11 taken along the BB' direction As illustrated in FIGS. 11 and 12, a touch liquid crystal display 700 according to an embodiment of the present disclosure includes: a cover glass 32, an opposite substrate 10, a TFT array substrate 20, a liquid crystal layer 30 and a first flexible printed circuit board 40. The opposite substrate 10 and the TFT array substrate 20 are arranged opposite to each other. The opposite substrate 10 has an inner surface facing the TFT array substrate 20 and an opposite outside surface, and the cover glass 32 is disposed on the outside surface of the opposing substrate 10.

The liquid crystal layer 30 is sandwiched between the opposite substrate 10 and the TFT array substrate 20. In another embodiment, any appropriate type of display elements capable of displaying videos and/or images, such as plasma display elements, field emission display elements, organic light-emitting diodes, light-emitting diodes, quantum dots (QDs) display elements, electrophoretic display elements, etc., may be disposed between the opposite substrate 10 and the TFT array substrate 20. The display elements are not limited by the present disclosure. Accordingly, the touch liquid crystal display 700 can be called as a touch control display for various display elements.

The first flexible printed circuit board 40 is electrically connected with the cover glass 32 and the TFT array substrate 20. The first flexible printed circuit board 40 is electrically connected a touch driving integrated circuit (IC) 70. The touch liquid crystal display 1300 also includes a display driving integrated circuit (IC) (not drawn in FIGS. 11-12) for driving the touch liquid crystal display 700 to display images, which are not explained in detail here.

The cover glass 32, the opposite substrate 10 and the TFT array substrate 20 collectively define a display area (the area inside the dashed square) and a non-display area (the area outside the dashed square) surrounding the display area. The cover glass 32 is made of transparent rigid or flexible materials, such as transparent glass, or transparent plastic, and is attached to the outside surface of the opposing substrate 10 by liquid optically clear adhesives (LOCA).

The cover glass 32 includes a third substrate 31 defining the display area and the non-display area, and a plurality of second electrodes 13. The third substrate 31 (of the cover glass 32) has an inner surface facing the opposing substrate 10 and an outside surface. The plurality of second electrodes 13 are disposed in the non-display area of the third substrate 31 and, meanwhile, disposed on the inner surface of the third substrate 31.

The opposite substrate 10 can be a color filter substrate or any appropriate substrates. The opposite substrate 10 can include a first substrate 11 defining the display area and the non-display area, and a plurality of first electrodes 12. In particular, the plurality of first electrodes 12 are located in the display area of the first substrate 11. The first substrate 11 (of the opposite substrate 10) has an inner surface facing the TFT array substrate 20 and an outside surface. In one embodiment, the plurality of first electrodes 12 are located on the inner surface of the first substrate 11, in another embodiment, the plurality of first electrodes 12 are located on the outside surface of the first substrate 11.

For example, as shown in FIG. 12, which is a sectional view of FIG. 11 taken along the BB', the plurality of first electrodes 12 are located on the outside surface of the first substrate 11. Referring to FIG. 12 and FIG. 11, the plurality of first electrodes 12 are spaced apart from one another and substantially extend along a first direction. The plurality of second electrodes 13 are spaced apart from one another along the first direction and on two opposite sides of the first substrate 11. Further, each of the plurality of second electrodes 13 is electrically connected with the first flexible printed circuit board 40 through a wire terminal 14.

Further, the TFT array substrate 20 includes a second substrate 21 and a plurality of third electrodes 22. The plurality of third electrodes 22 are located in the display area of the second substrate 21 and arranged opposite to the plurality of first electrodes 12. The plurality of third electrodes 22 are spaced apart from one another and substantially extend along a second direction. The first direction intersects the second direction to form an angle which is larger than 0° and smaller than or equal to 90°. In one embodiment, the angle formed between the first direction and the second direction is about 90°. Each of the plurality of third electrodes 22 are electrically connected with the first flexible printed circuit board 40 through a wire terminal 14.

The plurality of first electrodes 12 can be touch driving electrodes or touch sensing electrodes. The plurality of third electrodes 22 can be driving electrode or sensing electrode. The plurality of second electrodes 13 can be driving electrodes, or sensing electrodes, or both driving electrodes and sensing electrodes. Moreover, at least one of the plurality of third electrodes 22 can be multiplexed as a common electrode of the TFT array substrate 20.

In one embodiment, the plurality of first electrodes 12 are sensing electrodes and the plurality of second electrodes 13 are driving electrodes, and the plurality of third electrodes 22 are driving electrodes.

As shown in FIGS. 11-12, in the display area, the plurality of first electrodes 12 are disposed intersecting the plurality of third electrodes 22 and opposite to the plurality of third electrodes 22, thereby realizing the touch function by mutual capacitance. In the non-display area, the touch function may be realized by self-capacitance of the plurality of second electrodes 13, or realized by mutual capacitance between the plurality of second electrodes 13 and the plurality of first electrodes 12. Thus, the touch function of the touch liquid crystal display 700 may be improved.

Figure 13:
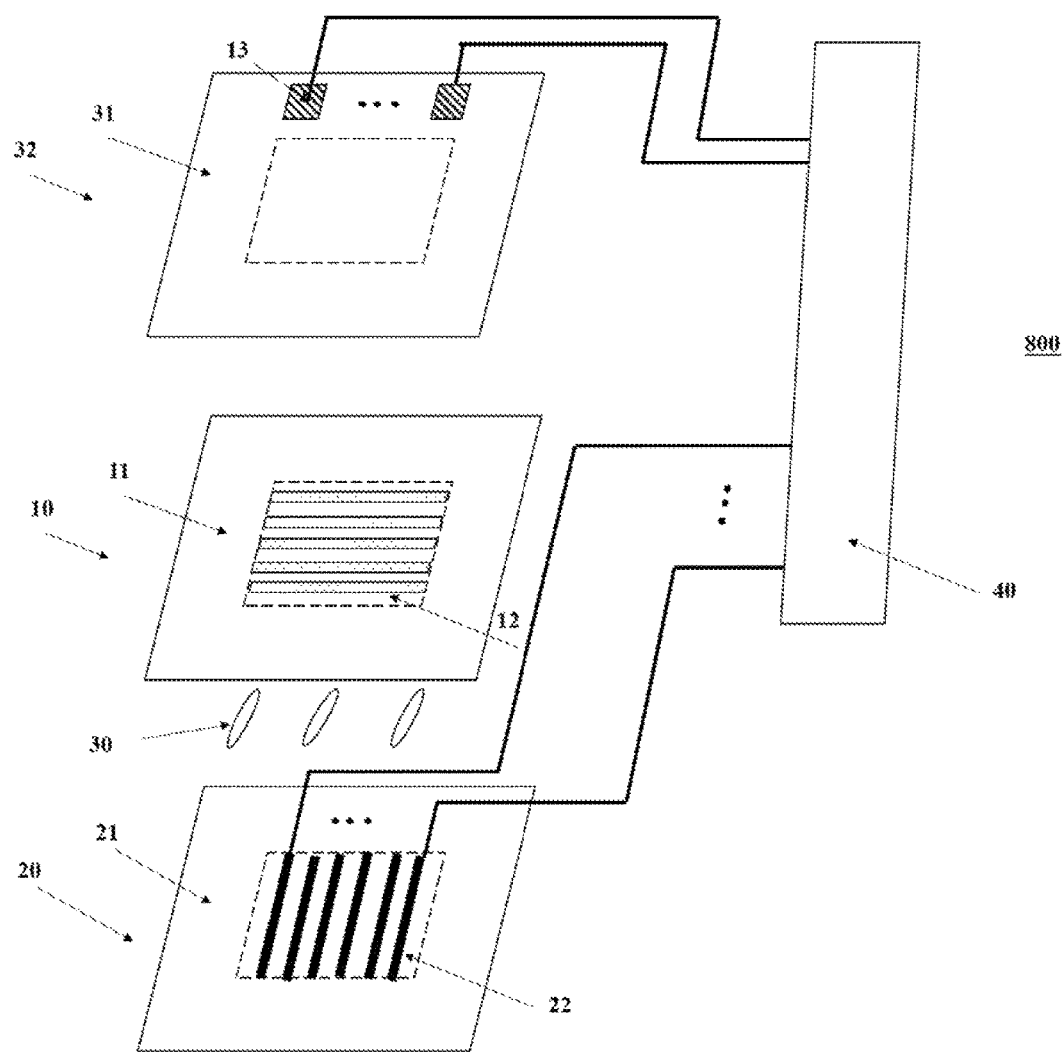
FIG. 13 illustrates a schematic structural diagram of a touch liquid crystal display according to an embodiment of the present disclosure.

Referring to FIG. 13, an embodiment of the present disclosure provides a touch liquid crystal display 800. The structure of touch liquid crystal display 800 is substantially the same as that of touch liquid crystal display 700 in FIG. 11, the difference is that the plurality of second electrodes 13 are spaced apart one another along the first direction and located on one side of the third substrate 31.

Figure 14:
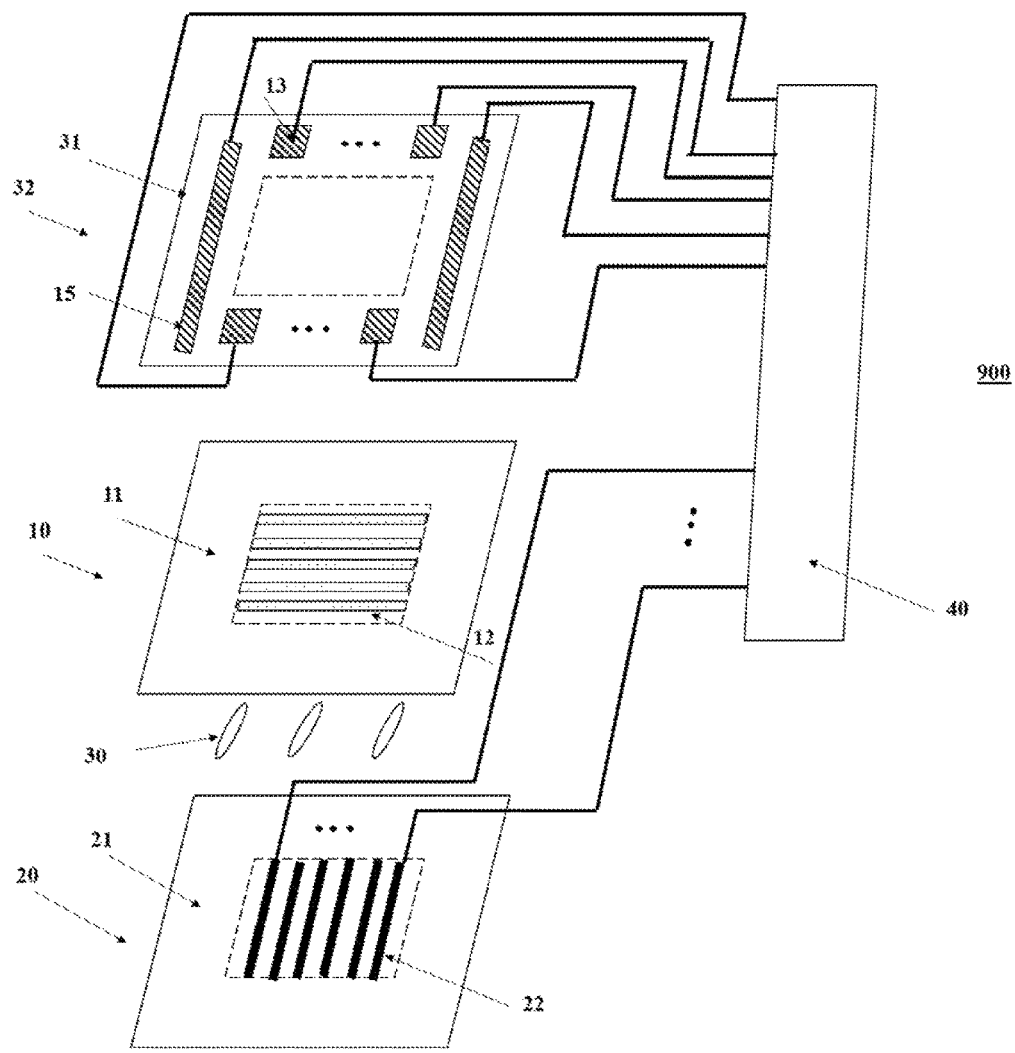
FIG. 14 illustrates a schematic structural diagram of a touch liquid crystal display according to an embodiment of the present disclosure.

Referring to FIG. 14, an embodiment of the present disclosure provides a touch liquid crystal display 900. The structure of touch liquid crystal display 900 is substantially the same as that of touch liquid crystal display 700 in FIG. 11, the difference is that the cover glass 32 further includes a plurality of the fourth electrodes 15 which have striped-shapes. The plurality of fourth electrodes 15 are disposed in the non-display area of the third substrate 31 and, meanwhile, disposed on the inner surface of the third substrate 31.

Particularly, the plurality of fourth electrodes 15 are located on two opposite sides of the third substrate 31 perpendicular to the first direction. Furthermore, the plurality of fourth electrodes 15 can be located on the same surface as the plurality of second electrodes 13. When the plurality of fourth electrodes 15 and the plurality of second electrodes 13 are located on the same surface of the third substrate 31, the plurality of fourth electrodes 15 and the plurality of second electrodes 13 can be formed by one pattern process using a same mask.

Each of the plurality of fourth electrodes 15 is electrically connected to the first flexible printed circuit board 40 by a wire terminal 14. In one embodiment, the plurality of fourth electrodes 15 can be driving electrodes or the sensing electrodes. In another embodiment, the plurality of fourth electrodes 15 comprise both the driving electrodes and the sensing electrodes.

Figure 15:
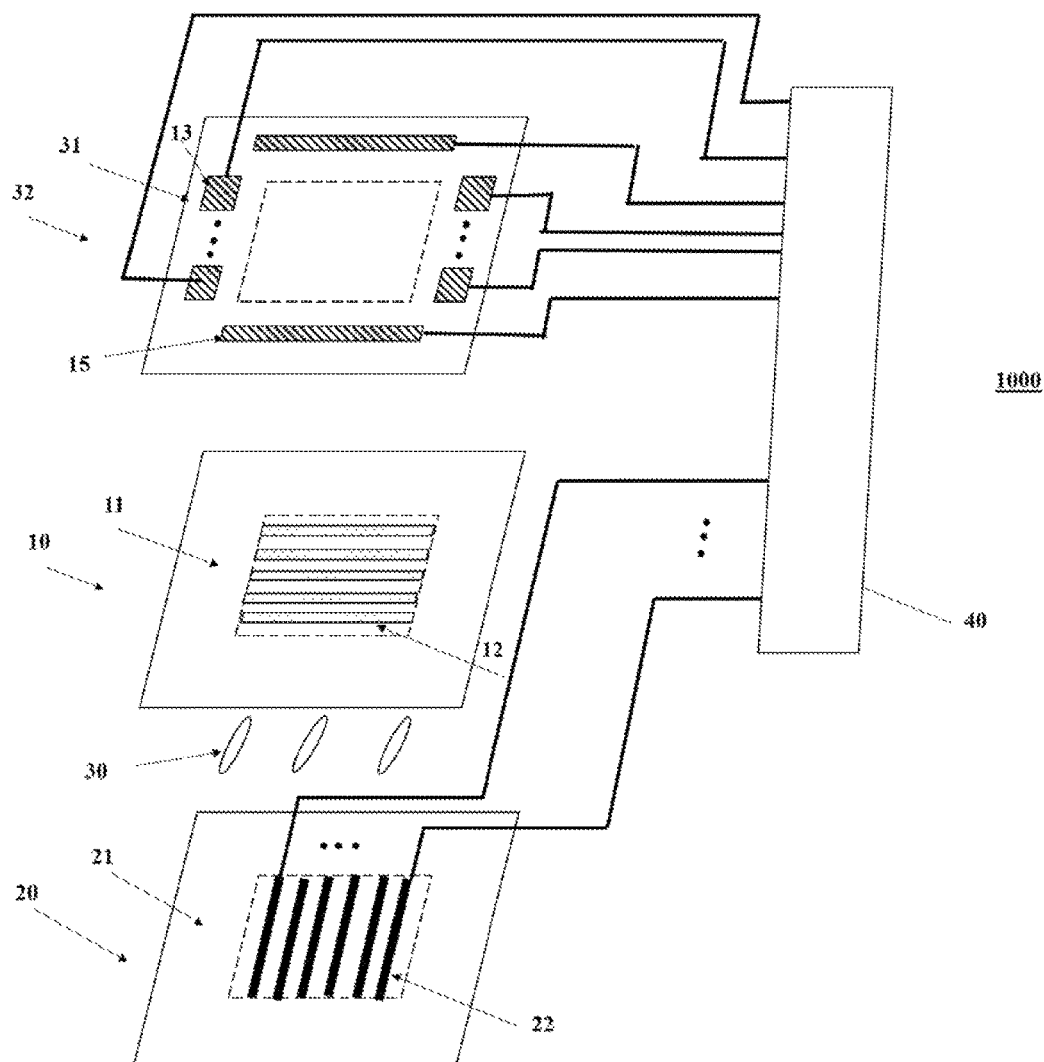
FIG. 15 illustrates a schematic structural diagram of a touch liquid crystal display according to an embodiment of the present disclosure.

Referring to FIG. 15, an embodiment of the present disclosure provides a touch liquid crystal display 1000. The structure of touch liquid crystal display 1000 is substantially the same as that of touch liquid crystal display 900 in FIG. 14, the difference is that the plurality of fourth electrodes 15 are located parallel on two sides of the third substrate 31 parallel to the first direction, while the plurality of second electrodes 12 are located on two sides of the third substrate 31 perpendicular to the first direction.

Figure 16:
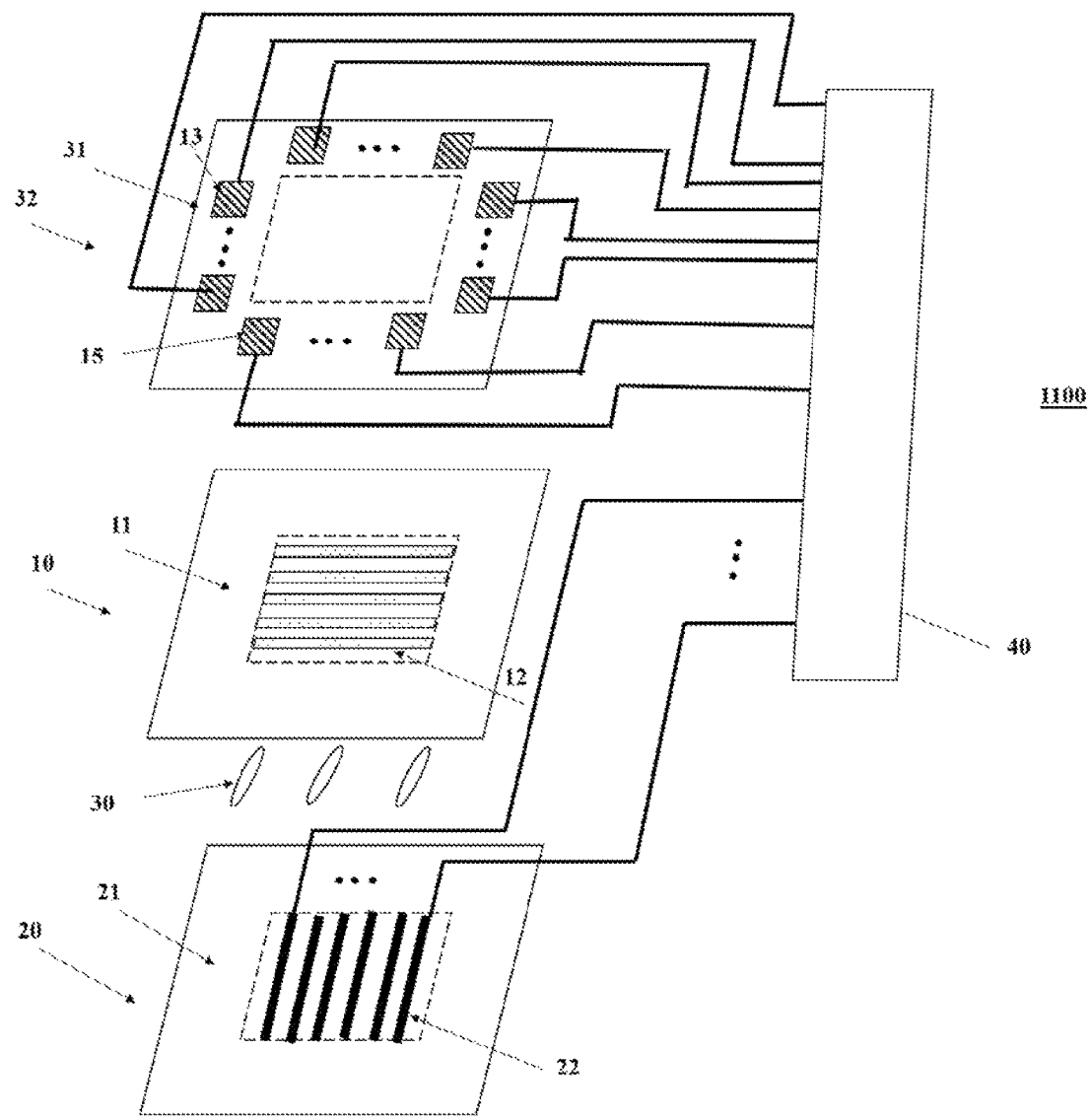
FIG. 16 illustrates a schematic structural diagram of a touch liquid crystal display according to an embodiment of the present disclosure.

Referring to FIG. 16, an embodiment of the present disclosure provides a touch liquid crystal display 1100. The structure of touch liquid crystal display 1100 is substantially the same as that of touch liquid crystal display 1000 in FIG. 15. The difference is that the plurality of fourth electrodes 15 have sheet shapes. The plurality of fourth electrodes 15 are spaced apart from one another on two sides of the third substrate 31 parallel to the first direction.

Figure 17:
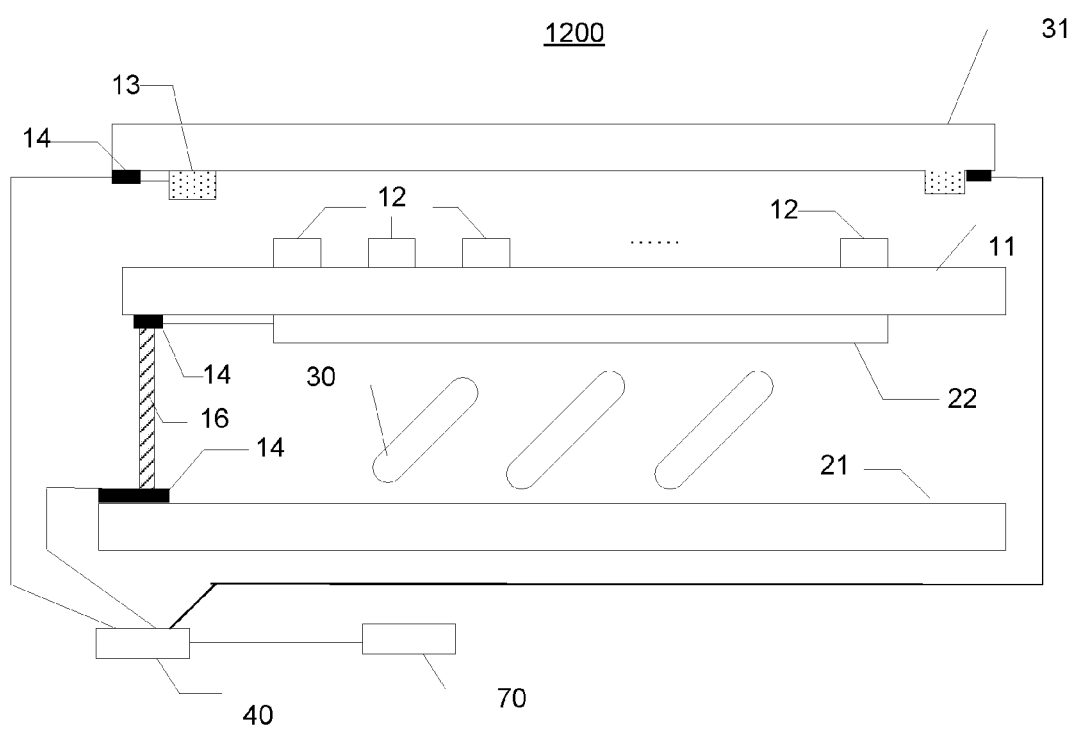
FIG. 17 illustrates a sectional view of a touch liquid crystal display according to an embodiment of the present disclosure.

Referring to FIG. 17, an embodiment of the present disclosure provides a touch liquid crystal display 1200. The structure of touch liquid crystal display 1200 is substantially the same as that of touch liquid crystal display 700 in FIG. 11 and FIG. 12, the difference is that the plurality of third electrodes 22 are located on the inner surface of the first substrate 11, where the inner surface of the first substrate 11 is facing the second substrate 21. Moreover, the plurality of third electrodes 22 can be electrically connected with the first flexible printed circuit board 40 through the wire terminal 14 and the conductive adhesive 16 located on the first substrate 11 and the second substrate 21.

Figure 18:
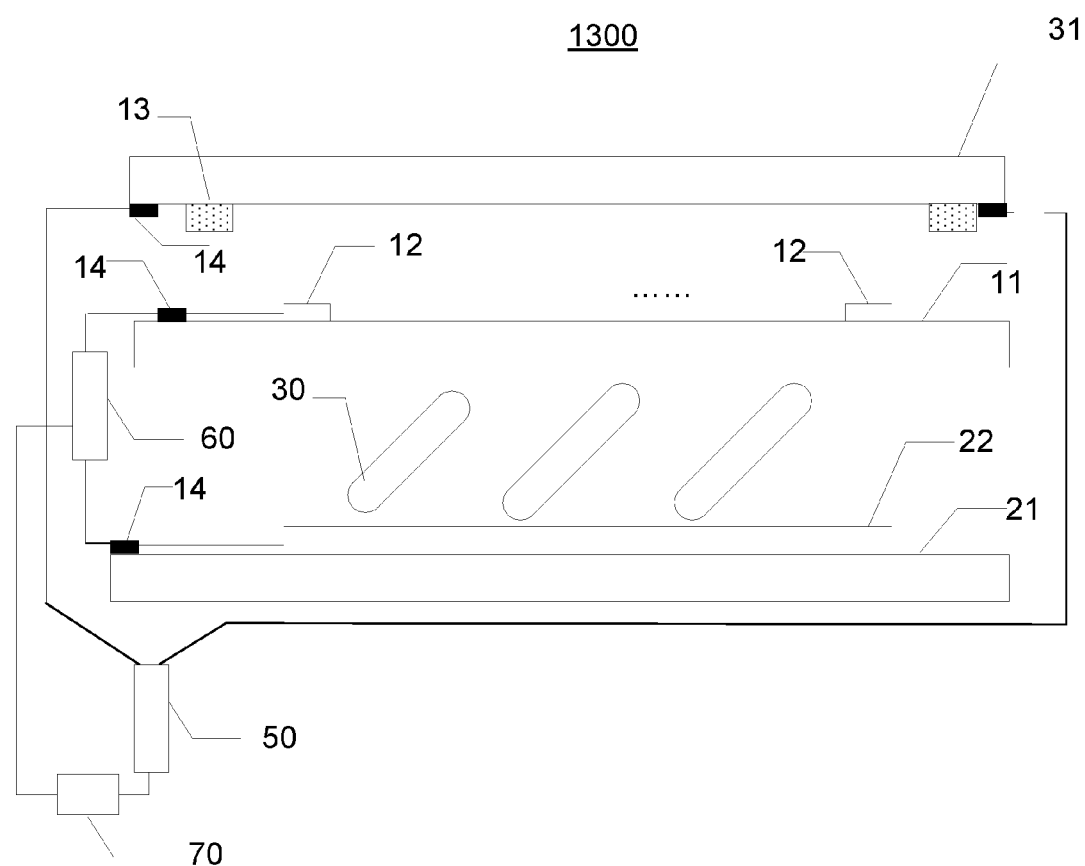
FIG. 18 illustrates a sectional view of a touch liquid crystal display according to an embodiment of the present disclosure.

Referring to FIG. 18, an embodiment of the present disclosure provides a touch liquid crystal display 1300. The structure of touch liquid crystal display 1300 is substantially the same as that of touch liquid crystal display 700 in FIG. 12, the difference is that each of the plurality of second electrodes 13 is electrically connected with a second flexible printed circuit board 50 through a wire terminal 14, while the plurality of first electrodes 12 and the plurality of third electrodes 22 are electrically connected with a third flexible printed circuit board 60 through the corresponding wire terminals 14. The second flexible printed circuit board 50 and the third flexible printed circuit board 60 each is an individual flexible printed circuit board, which are further electrically connected to a touch driving integrated circuit (IC) 70.

When the touch liquid crystal display 1300 also includes the plurality of fourth electrodes 15, which are disposed in the non-display area of the third substrate 31 and, meanwhile, disposed on the inner surface of the third substrate 31, each of the plurality of fourth electrodes 15 is also electrically connected with the third flexible printed circuit board 50 through the corresponding wire terminal 14.

In addition, the touch liquid crystal display 1300 also includes a display driving integrated circuit (IC) (not drawn in FIG. 18) for driving the touch liquid crystal display 1300 to display images, which are not explained in detail here.

Figure 19:
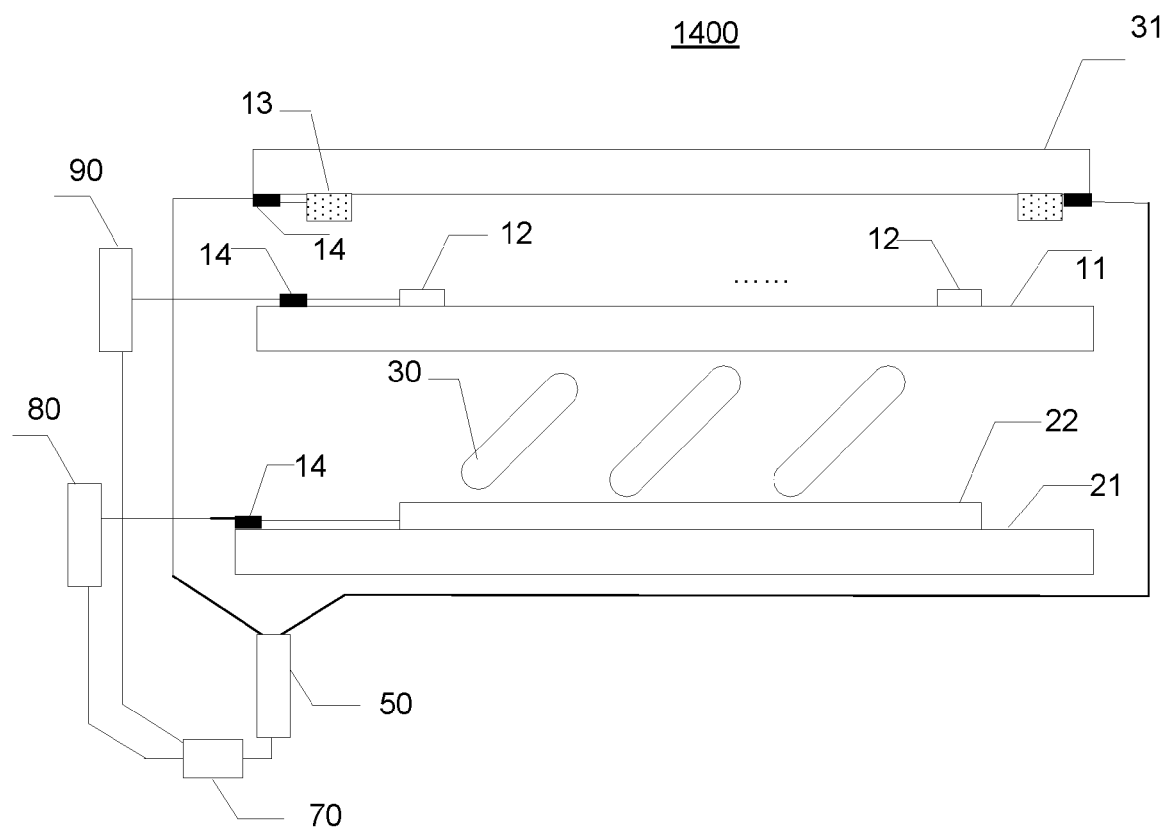
FIG. 19 illustrates a sectional view of a touch liquid crystal display according to an embodiment of the present disclosure.

Referring to FIG. 19, an embodiment of the present disclosure provides a touch liquid crystal display 1400. The structure of touch liquid crystal display 1400 is substantially the same as that of touch liquid crystal display 1300 in FIG. 18, the difference is that each of the plurality of second electrodes 13 is electrically connected with a second flexible printed circuit board 50 through a wire terminal 14, each of the plurality of third electrodes 22 is electrically connected with a fourth flexible printed circuit board 80 through the corresponding wire terminals 14, and each of the plurality of first electrodes 12 is electrically connected with a fifth flexible printed circuit board 90 through a wire terminals 14. The second flexible printed circuit board 50, the fourth flexible printed circuit board 80, and the fifth flexible printed circuit board 90 each is an individual flexible printed circuit board, which is further electrically connected to a touch driving integrated circuit (IC) 70.

When the touch liquid crystal display 1400 also includes the plurality of fourth electrodes 15, which are disposed in the non-display area of the third substrate 31 and, meanwhile, disposed on the inner surface of the third substrate 31, each of the plurality of fourth electrodes 15 is also electrically connected with the third flexible printed circuit board 50 through the corresponding wire terminal 14.

In addition, the touch liquid crystal display 1400 also includes a display driving integrated circuit (IC) (not drawn in FIG. 19) for driving the touch liquid crystal display 1400 to display images, which are not explained in detail here.

Figure 20:
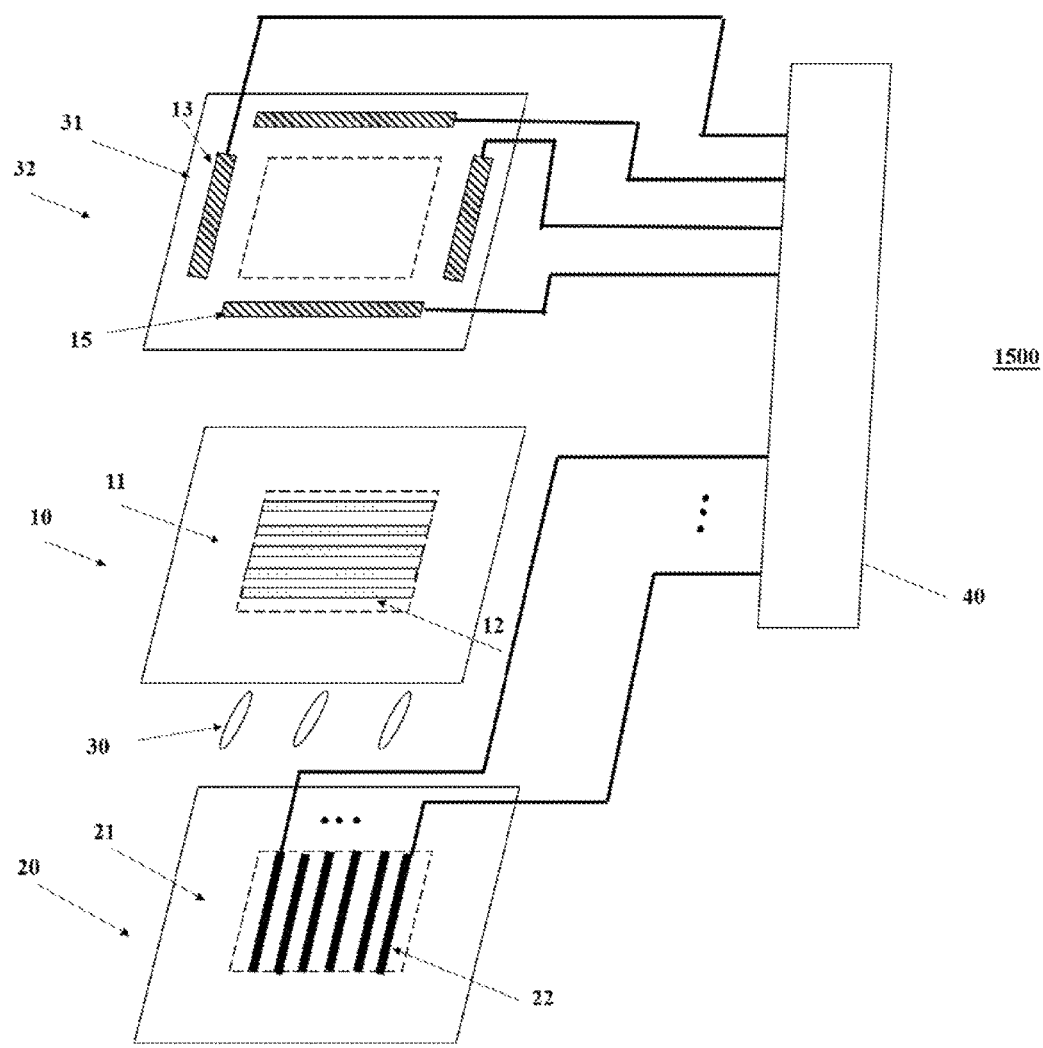
FIG. 20 illustrates a schematic structural diagram of a touch liquid crystal display according to an embodiment of the present disclosure.

Referring to FIG. 20, an embodiment of the present disclosure provides a touch liquid crystal display 1500. The structure of touch liquid crystal display 1500 is substantially the same as that of touch liquid crystal display 1000 in FIG. 15, the difference is that the plurality of second electrodes 13 have striped-shapes, and are located parallel on two sides of the third substrate 31 perpendicular to the first direction.

Figure 21:
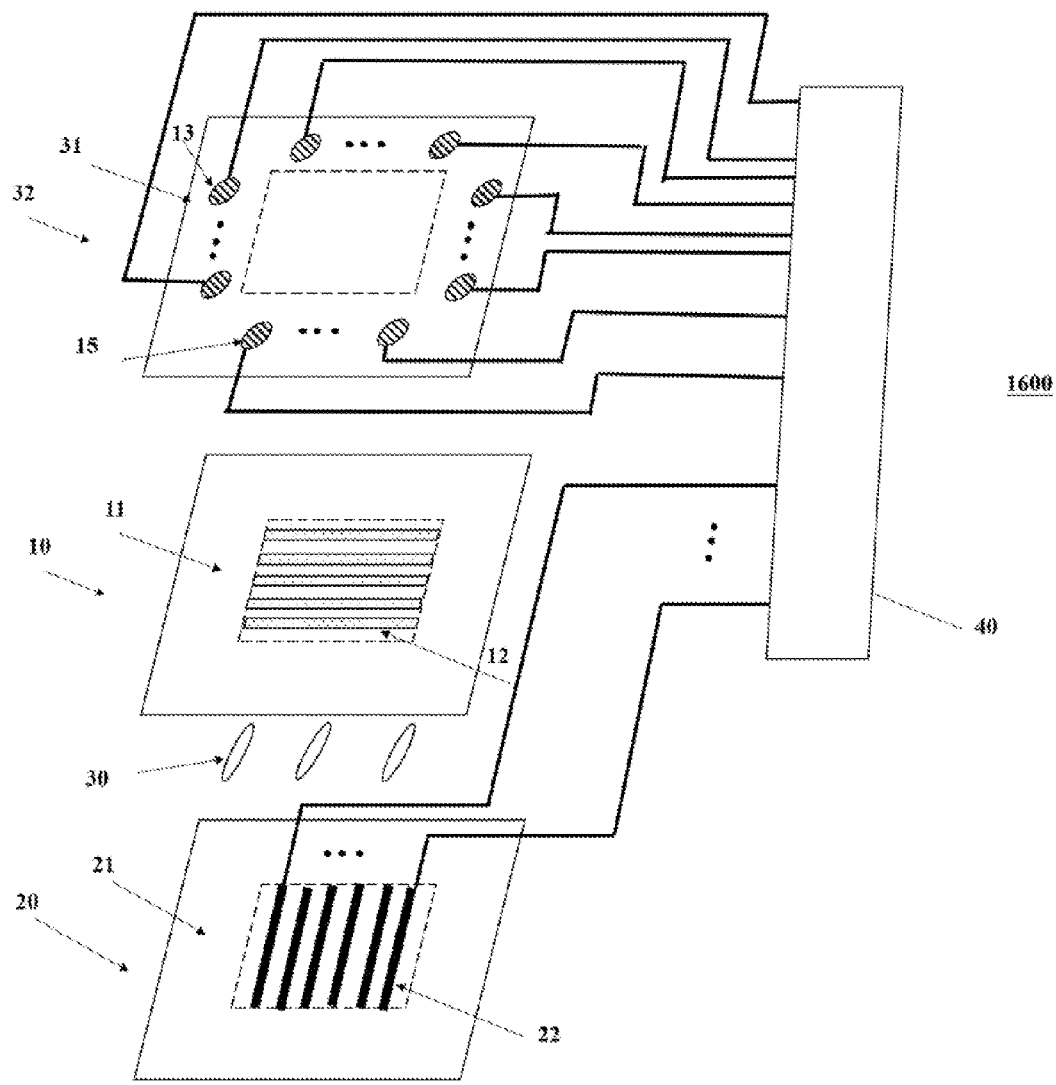
FIG. 21 illustrates a schematic structural diagram of a touch liquid crystal display according to an embodiment of the present disclosure.

Referring to FIG. 21, an embodiment of the present disclosure provides a touch liquid crystal display 1600. The structure of touch liquid crystal display 1600 is substantially the same as that of touch liquid crystal display 1100 in FIG. 16. The difference is that the plurality of fourth electrodes 15 and the plurality of second electrodes 13 each has a circular shape. The plurality of fourth electrodes 15 are spaced apart from one another on two sides of the third substrate 31 parallel to the first direction, while the plurality of second electrodes 13 are spaced apart from one another on two sides of the third substrate 31 perpendicular to the first direction.

In the disclosed embodiments, the shapes and number of the second electrodes 13 and fourth electrodes 15 are for illustrative purposes, and are not intended to limit the scope of the present disclosure. In practical applications, the second electrodes 13 and fourth electrodes 15 may have any appropriate shapes and numbers.

The touch liquid crystal display according to the embodiments of the present disclosure can be applied to a mobile phone, a tablet PC, a TV set, a display, a notebook PC, a digital frame, a navigator and any other product or component.

Figure 22:
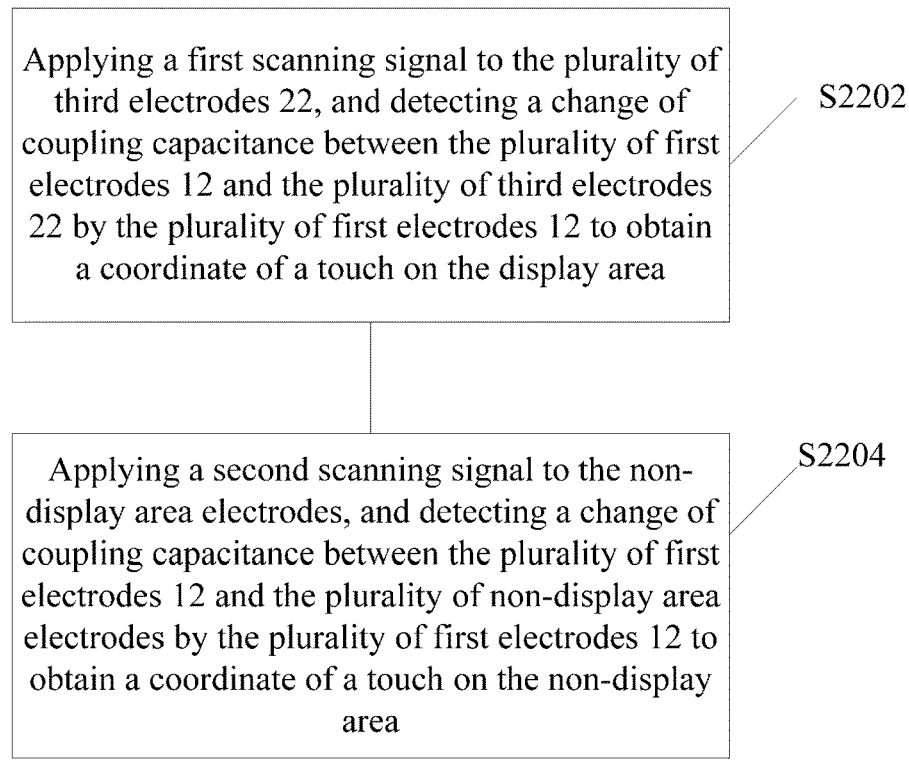
FIG. 22 illustrates a flow chart of a method of controlling a touch liquid crystal display according to an embodiment of the present disclosure.

The present disclosure also provides a method for controlling the touch liquid crystal display. Referring to FIG. 22, a method of controlling touch liquid crystal display according to the embodiment of the present disclosure, comprises:

S2202: applying a first scanning signal to the plurality of third electrodes 22, and detecting a change of coupling capacitance between the plurality of first electrodes 12 and the plurality of third electrodes 22 by the plurality of first electrodes 12 to obtain a coordinate of a touch on the display area; and S2204: applying a second scanning signal to the non-display area electrodes, and detecting a change of coupling capacitance between the plurality of first electrodes 12 and the plurality of non-display area electrodes by the plurality of first electrodes 12 to obtain a coordinate of a touch on the non-display area.

The perform order of steps S2202 and S2204 is not limited thereto.

Figure 23:
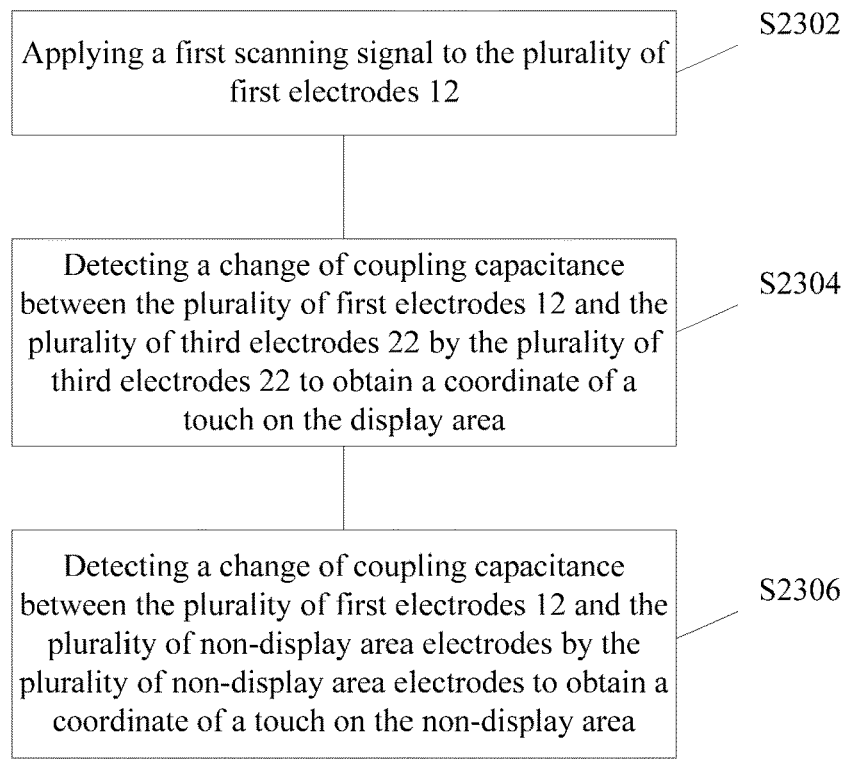
FIG. 23 illustrates a flow chart of a method of controlling a touch liquid crystal display according to an embodiment of the present disclosure.

Referring to FIG. 23, a method of controlling touch liquid crystal display according to another embodiment of the present disclosure, includes:

S2302: applying a first scanning signal to the plurality of first electrodes 12;

S2304: detecting a change of coupling capacitance between the plurality of first electrodes 12 and the plurality of third electrodes 22 by the plurality of third electrodes 22 to obtain a coordinate of a touch on the display area; and S2306: detecting a change of coupling capacitance between the plurality of first electrodes 12 and the plurality of non-display area electrodes by the plurality of non-display area electrodes to obtain a coordinate of a touch on the non-display area.

The step S2304 and the step S2306 can be performed at the same time or can be performed separately. In one embodiment, the step S2304 and the step S2306 are performed at the same time to save time.

Figure 24:
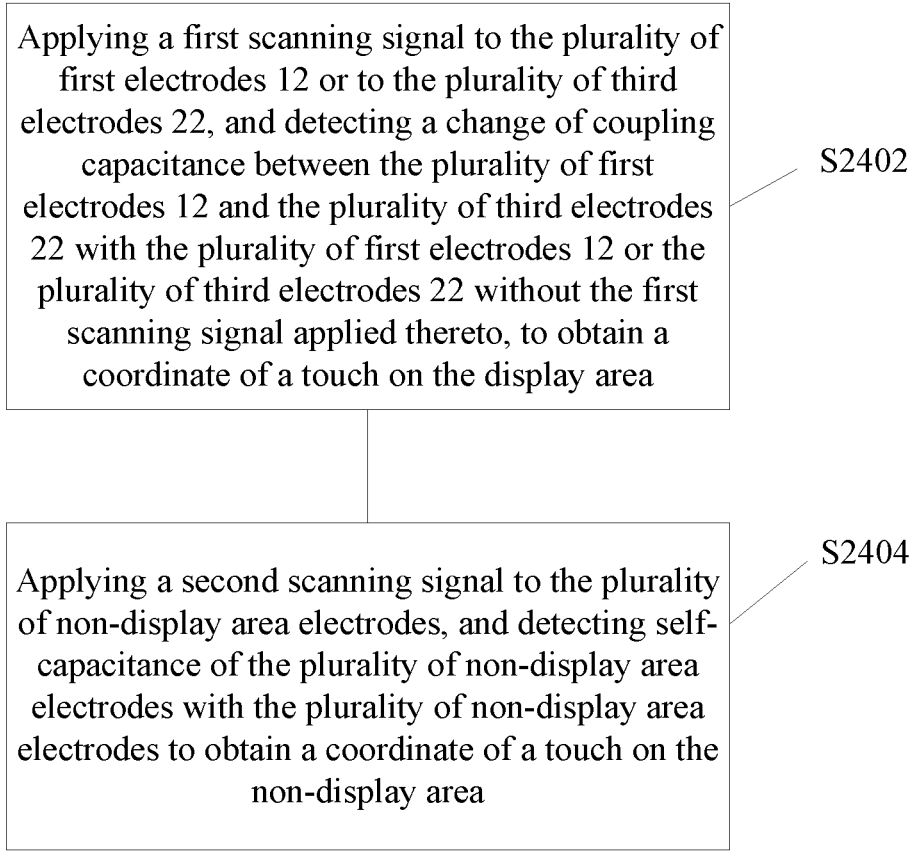
FIG. 24 illustrates a flow chart of a method of controlling a touch liquid crystal display according to an embodiment of the present disclosure.

Referring to FIG. 24, a method of controlling touch liquid crystal display according to another embodiment of the present disclosure, includes:

S2402: applying a first scanning signal to the plurality of first electrodes 12 or to the plurality of third electrodes 22, and detecting a change of coupling capacitance between the plurality of first electrodes 12 and the plurality of third electrodes 22 with the plurality of first electrodes 12 or the plurality of third electrodes 22 without the first scanning signal applied thereto, to obtain a coordinate of a touch on the display area; and S2404: applying a second scanning signal to the plurality of non-display area electrodes, and detecting self-capacitance of the plurality of non-display area electrodes with the plurality of non-display area electrodes to obtain a coordinate of a touch on the non-display area.

The steps S2402 and S2404 can be performed at the same time or different time. In one embodiment, the steps S2402 and S2404 are performed substantially at the same time to save scan time. An intensity of the first scanning signal can be the same as an intensity of the second scanning signal or can be different from the intensity of second scanning signal. Particularly, the intensity of first scanning signal can be stronger than or equal to the intensity of second scanning signal.

Evidently those skilled in the art can make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

What is claimed is:

1. A touch control display, comprising:
   a thin-film-transition (TFT) array substrate;
   an opposite substrate arranged opposite to the TFT array substrate, wherein the opposite substrate has an inner surface facing the TFT array substrate and an outside surface;
   a cover glass disposed on the outside surface of the opposite substrate, wherein the cover glass has an inner surface facing the opposing substrate and an outside surface, and the cover glass, the TFT array substrate, and the opposite substrate collectively define a display area and a non-display area;
   a plurality of first electrodes disposed in the display area of the opposite substrate;
   a plurality of second electrodes disposed in the non-display area of the cover glass, and disposed on the inner surface of the cover glass; and
   a plurality of third electrodes disposed between the opposite substrate and the TFT array substrate, wherein the plurality of third electrodes are disposed opposite to the plurality of first electrodes, and at least one of the plurality of third electrodes is multiplexed as a common electrode of the TFT array substrate,
   wherein the plurality of first electrodes are touch driving electrodes, and the plurality of second electrodes and the plurality of third electrodes are touch sensing electrodes,
   a coordinate of a touch in the display area is obtained based on a change of coupling capacitance between the plurality of first electrodes and the plurality of third electrodes, and
   a coordinate of a touch in the non-display area is obtained based on a change of coupling capacitance between the plurality of first electrodes and the plurality of second electrodes.

2. The touch control display according to claim 1, wherein:
   the plurality of first electrodes extend along a first direction and are spaced apart from one another;
   the plurality of third electrodes extend along a second direction and are spaced apart from one another; and
   the first direction intersects the second direction.

3. The touch control display according to claim 2, wherein the first direction is substantially perpendicular to the second direction.

4. The touch control display according to claim 1, wherein the plurality of first electrodes are disposed on the outside surface of the opposing substrate.

5. The touch control display according to claim 1, the opposite substrate is a color filter substrate.

6. The touch control display according to claim 1, wherein the TFT array substrate has an inner surface facing the opposing substrate and an outside surface, and the plurality of third electrodes are disposed on the inner surface of the TFT array substrate.

7. The touch control display according to claim 1, wherein the plurality of third electrodes are disposed on the inner surface of the opposing substrate.

8. The touch control display according to claim 1, further comprising:
a first flexible printed circuit board electrically connected to the plurality of first electrodes;
a second flexible printed circuit board electrically connected to the plurality of second electrodes; and
a third flexible printed circuit board electrically connected to the plurality of third electrodes,
wherein the flexible printed circuit board, the second flexible printed circuit board, and the third flexible printed circuit board are further electrically connected to a touch driving integrated circuit (IC).

9. The touch control display according to claim 8, further comprising:
a plurality of wire terminals located in the non-display area,
wherein each of the plurality of first electrodes is electrically connected to the first flexible printed circuit board by a wire terminal,
each of the plurality of second electrodes is electrically connected to the second flexible printed circuit board by a wire terminal, and
each of the plurality of third electrodes is electrically connected to the third flexible printed circuit board by a wire terminal.

10. The touch control display according to claim 9, wherein:
the first flexible printed circuit board and the third flexible printed circuit board are the same flexible printed circuit board, and
the second flexible printed circuit is an individual flexible printed circuit different from the first flexible printed circuit board and the third flexible printed circuit board.

11. The touch control display according to claim 9, wherein:
the first flexible printed circuit board, the second flexible printed circuit board, and the third flexible printed circuit board each is an individual flexible printed circuit.

12. The touch control display according to claim 1, wherein a second electrode has at least one of a striped-shape and a sheet shape, and the second electrodes are spaced apart from one another on at least one side of the display area of the cover glass.

13. The touch control display according to claim 12, wherein each of the plurality of second electrodes has the sheet shape, and the second electrodes are spaced apart from one another at periphery of the display area of the cover glass.

14. The touch control display according to claim 1, further comprising:
a plurality of fourth electrodes disposed in the non-display area of the cover glass,
wherein the plurality of fourth electrodes are disposed on the inner surface of the cover glass, and disposed on the same surface as the plurality of second electrodes,
the plurality of fourth electrodes are touch sensing electrodes.

15. The touch control display according to claim 14, further comprising:
a first flexible printed circuit board, a second flexible printed circuit board, and a third flexible printed circuit board electrically connected to a touch driving integrated circuit (IC); and
a plurality of wire terminals located in the non-display area,
wherein each of the plurality of first electrodes is electrically connected to the first flexible printed circuit board by a wire terminal,
each of the plurality of second electrodes is electrically connected to the second flexible printed circuit board by a wire terminal,
each of the plurality of third electrodes is electrically connected to the third flexible printed circuit board by a wire terminal, and
each of the plurality of fourth electrodes is electrically connected to the second flexible printed circuit board by a wire terminal.

16. The touch control display according to claim 14, wherein:
a fourth electrode has at least one of a striped-shape and a sheet shape, and the fourth electrode is spaced apart from one another on at least one side of the display area.

17. A touch control display, comprising:
a thin-film-transition (TFT) array substrate;
an opposite substrate arranged opposite to the TFT array substrate, wherein the opposite substrate has an inner surface facing the TFT array substrate and an outside surface;
a cover glass disposed on the outside surface of the opposite substrate, wherein the cover glass has an inner surface facing the opposing substrate and an outside surface, and the cover glass, the TFT array substrate, and the opposite substrate collectively define a display area and a non-display area;
a plurality of first electrodes disposed in the display area of the opposite substrate;
a plurality of second electrodes disposed in the non-display area of the cover glass, and disposed on the inner surface of the cover glass; and
a plurality of third electrodes disposed between the opposite substrate and the TFT array substrate, wherein the plurality of third electrodes are disposed opposite to the plurality of first electrodes, and at least one of the plurality of third electrodes is multiplexed as a common electrode of the TFT array substrate,
wherein the plurality of first electrodes are touch driving electrodes, the plurality of third electrodes are touch sensing electrodes, and the plurality of second electrodes comprise both touch driving electrodes and touch sensing electrodes.

18. A method of controlling a touch control display, wherein the touch control display comprises a thin-film-transition (TFT) array substrate; an opposite substrate arranged opposite to the TFT array substrate, wherein the opposite substrate has an inner surface facing the TFT array substrate and an outside surface; a cover glass disposed on the outside surface of the opposite substrate, wherein the cover glass has an inner surface facing the opposing substrate and an outside surface, and the cover glass, the TFT array substrate, and the opposite substrate collectively define a display area and a non-display area; a plurality of first electrodes disposed in the display area of the opposite substrate; a plurality of second electrodes disposed in the non-display area of the cover glass, and disposed on the inner surface of the cover glass; and a plurality of third electrodes disposed between the opposite substrate and the TFT array substrate, wherein the plurality of third electrodes are disposed opposite to the plurality of first electrodes, and at least one of the plurality of third electrodes is multiplexed as a common electrode of the TFT array substrate, wherein the plurality of first electrodes are touch driving electrodes, and the plurality of second electrodes and the plurality of third electrodes are touch sensing electrodes, wherein the method comprises:

applying a first scanning signal to the plurality of third electrodes;

detecting a change of coupling capacitance between the plurality of first electrodes and the plurality of third electrodes with the plurality of first electrodes to obtain a coordinate of a touch in the display area;

applying a second scanning signal to the plurality of second electrodes; and detecting a change of coupling capacitance between the plurality of first electrodes and the plurality of second electrodes by the plurality of first electrodes to obtain a coordinate of a touch in the non-display area.

19. A method of controlling a touch control display, wherein the touch control display comprises a thin-film-transition (TFT) array substrate; an opposite substrate arranged opposite to the TFT array substrate, wherein the opposite substrate has an inner surface facing the TFT array substrate and an outside surface; a cover glass disposed on the outside surface of the opposite substrate, wherein the cover glass has an inner surface facing the opposing substrate and an outside surface, and the cover glass, the TFT array substrate, and the opposite substrate collectively define a display area and a non-display area; a plurality of first electrodes disposed in the display area of the opposite substrate; a plurality of second electrodes disposed in the non-display area of the cover glass, and disposed on the inner surface of the cover glass; and a plurality of third electrodes disposed between the opposite substrate and the TFT array substrate, wherein the plurality of third electrodes are disposed opposite to the plurality of first electrodes, and at least one of the plurality of third electrodes is multiplexed as a common electrode of the TFT array substrate, wherein the plurality of first electrodes are touch driving electrodes, the plurality of third electrodes are touch sensing electrodes, and the plurality of second electrodes comprise both touch driving electrodes and touch sensing electrodes, wherein the method comprises:

applying a first scanning signal to the plurality of first electrodes or the plurality of third electrodes;

detecting a change of coupling capacitance between the plurality of first electrodes and the plurality of third electrodes with the plurality of third electrodes or the plurality of first electrodes which are not applied with the first scanning signal, to obtain a coordinate of a touch on the display area;

applying a second scanning signal to the plurality of second electrodes; and detecting a self-capacitance of the plurality of second electrodes by the plurality of second electrodes, to obtain a coordinate of a touch on the non-display area.

* * * * *